(12) United States Patent
Packer et al.

(10) Patent No.: US 10,885,238 B1
(45) Date of Patent: Jan. 5, 2021

(54) PREDICTING FUTURE INDOOR AIR TEMPERATURE FOR BUILDING

(71) Applicant: OPOWER, INC., Arlington, VA (US)

(72) Inventors: Benjamin Packer, Palo Alto, CA (US); William Derose, Fremont, CA (US); Agustin Fonts, Santa Clara, CA (US); Ralph Niewmierzycki, Belmont, CA (US)

(73) Assignee: OPOWER, INC., Redwood Shores, CA (US)

( * ) Notice: Subject to any disclaimer, the term of this patent is extended or adjusted under 35 U.S.C. 154(b) by 934 days.

(21) Appl. No.: 14/465,538

(22) Filed: Aug. 21, 2014

Related U.S. Application Data

(60) Provisional application No. 61/925,521, filed on Jan. 9, 2014.

(51) Int. Cl.
*A63B 17/02* (2006.01)
*G06F 30/20* (2020.01)
*H04L 29/06* (2006.01)

(52) U.S. Cl.
CPC .............. *G06F 30/20* (2020.01); *H04L 67/42* (2013.01)

(58) Field of Classification Search
None
See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | |
| 5,513,519 A | 5/1996 | Cauger et al. | |
| 5,566,084 A | 10/1996 | Cmar | |
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,948,303 A | 9/1999 | Larson | |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Doon Y Chow
*Assistant Examiner* — Abdou K Seye
(74) *Attorney, Agent, or Firm* — Kraguljac Law Group, LLC

(57) ABSTRACT

A method and system for calculating an estimated future indoor air temperature for a building receives information about the building, information about environmental conditions, and thermostat set point information, determines, using a processor, thermodynamic properties of the building based on the received information about the building, and calculates the estimated future indoor air temperature using the determined thermodynamic properties of the building, the received information about environmental conditions, and the received thermostat set point information.

15 Claims, 15 Drawing Sheets

(56) References Cited

U.S. PATENT DOCUMENTS

| | | | |
|---|---|---|---|
| 6,035,285 A | 3/2000 | Schlect et al. | |
| 6,088,688 A | 7/2000 | Crooks et al. | |
| 6,295,504 B1 | 9/2001 | Ye et al. | |
| 6,327,605 B2 | 12/2001 | Arakawa et al. | |
| 6,701,298 B1 | 3/2004 | Jutsen | |
| 6,732,055 B2 | 5/2004 | Bagepalli et al. | |
| 6,778,945 B2 | 8/2004 | Chassin et al. | |
| 6,785,620 B2 | 8/2004 | Kishlock et al. | |
| 6,972,660 B1 | 12/2005 | Montgomery, Jr. et al. | |
| 7,020,508 B2 | 3/2006 | Stivoric et al. | |
| 7,073,073 B1 | 7/2006 | Nonaka et al. | |
| 7,073,075 B2 | 7/2006 | Freyman et al. | |
| 7,136,710 B1 | 11/2006 | Hoffberg et al. | |
| 7,142,949 B2 | 11/2006 | Brewster et al. | |
| 7,149,727 B1 | 12/2006 | Nicholls et al. | |
| 7,200,468 B2 | 4/2007 | Ruhnke et al. | |
| 7,243,044 B2 | 7/2007 | McCalla | |
| 7,333,880 B2 | 2/2008 | Brewster et al. | |
| 7,356,548 B1 | 4/2008 | Culp et al. | |
| 7,444,251 B2 | 10/2008 | Nikovski et al. | |
| 7,460,502 B2 | 12/2008 | Arima et al. | |
| 7,460,899 B2 | 12/2008 | Almen | |
| 7,552,030 B2 | 6/2009 | Guralnik et al. | |
| 7,561,977 B2 | 7/2009 | Horst et al. | |
| 7,991,513 B2 | 8/2011 | Pitt | |
| 8,065,098 B2 | 11/2011 | Gautam | |
| 8,166,047 B1 | 4/2012 | Cohen et al. | |
| 8,180,591 B2 | 5/2012 | Yuen et al. | |
| 8,239,178 B2 | 8/2012 | Gray et al. | |
| 8,260,468 B2 | 9/2012 | Ippolito et al. | |
| 8,275,635 B2 | 9/2012 | Stivoric et al. | |
| 8,280,536 B1 | 10/2012 | Fadell et al. | |
| 8,348,840 B2 | 1/2013 | Heit et al. | |
| 8,375,118 B2 | 2/2013 | Hao et al. | |
| 8,417,061 B2 | 4/2013 | Kennedy et al. | |
| 8,478,447 B2 | 7/2013 | Fadell et al. | |
| 8,489,245 B2 | 7/2013 | Carrel et al. | |
| 8,583,288 B1 | 11/2013 | Rossi et al. | |
| 8,630,741 B1 | 1/2014 | Matsuoka et al. | |
| 8,660,813 B2 | 2/2014 | Curtis et al. | |
| 8,690,751 B2 | 4/2014 | Auphan | |
| 8,725,307 B2 * | 5/2014 | Healey | H05K 7/20836 700/300 |
| 8,751,432 B2 | 6/2014 | Berg-Sonne et al. | |
| 8,805,000 B2 | 8/2014 | Derby et al. | |
| 9,031,703 B2 | 5/2015 | Nakamura et al. | |
| 2002/0065581 A1 | 5/2002 | Fasca | |
| 2002/0178047 A1 | 11/2002 | Or et al. | |
| 2002/0198629 A1 | 12/2002 | Ellis | |
| 2003/0011486 A1 | 1/2003 | Ying | |
| 2003/0018517 A1 | 1/2003 | Dull et al. | |
| 2003/0023467 A1 | 1/2003 | Moldovan | |
| 2003/0216971 A1 | 11/2003 | Sick et al. | |
| 2004/0024717 A1 | 2/2004 | Sneeringer | |
| 2004/0111410 A1 | 6/2004 | Burgoon et al. | |
| 2004/0128111 A1 * | 7/2004 | Lang | F22B 35/18 702/188 |
| 2004/0140908 A1 | 7/2004 | Gladwin et al. | |
| 2005/0257540 A1 | 11/2005 | Choi et al. | |
| 2006/0089851 A1 | 4/2006 | Silby et al. | |
| 2006/0103549 A1 | 5/2006 | Hunt et al. | |
| 2007/0061735 A1 | 3/2007 | Hoffberg et al. | |
| 2007/0203860 A1 | 8/2007 | Golden et al. | |
| 2007/0213992 A1 | 9/2007 | Anderson et al. | |
| 2007/0227721 A1 * | 10/2007 | Springer | G05D 23/1931 165/291 |
| 2007/0255457 A1 | 11/2007 | Whitcomb et al. | |
| 2007/0260405 A1 | 11/2007 | McConnell et al. | |
| 2008/0027885 A1 | 1/2008 | van Putten et al. | |
| 2008/0167535 A1 | 7/2008 | Stivoric et al. | |
| 2008/0195561 A1 | 8/2008 | Herzig | |
| 2008/0281473 A1 | 11/2008 | Pitt | |
| 2008/0281763 A1 | 11/2008 | Yliniemi | |
| 2008/0306985 A1 | 12/2008 | Murray et al. | |
| 2009/0106202 A1 | 4/2009 | Mizrahi | |
| 2009/0204267 A1 | 8/2009 | Sustaeta et al. | |
| 2009/0326726 A1 | 12/2009 | Ippolito et al. | |
| 2010/0025483 A1 | 2/2010 | Hoeynck et al. | |
| 2010/0076835 A1 | 3/2010 | Silverman | |
| 2010/0082174 A1 | 4/2010 | Weaver | |
| 2010/0099954 A1 | 4/2010 | Dickinson et al. | |
| 2010/0138363 A1 | 6/2010 | Batterberry et al. | |
| 2010/0156665 A1 | 6/2010 | Krzyzanowski et al. | |
| 2010/0179704 A1 | 7/2010 | Ozog | |
| 2010/0198713 A1 | 8/2010 | Forbes, Jr. et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0217651 A1 | 8/2010 | Crabtree et al. | |
| 2010/0232671 A1 | 9/2010 | Dam et al. | |
| 2010/0286937 A1 | 11/2010 | Hedley et al. | |
| 2010/0289643 A1 | 11/2010 | Trundle et al. | |
| 2010/0324962 A1 | 12/2010 | Nesler et al. | |
| 2010/0332373 A1 | 12/2010 | Crabtree et al. | |
| 2011/0022429 A1 | 1/2011 | Yates et al. | |
| 2011/0023045 A1 | 1/2011 | Yates et al. | |
| 2011/0040666 A1 | 2/2011 | Crabtree et al. | |
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0153103 A1 * | 6/2011 | Brown | H02J 13/0062 700/291 |
| 2011/0178842 A1 | 7/2011 | Rane et al. | |
| 2011/0178937 A1 | 7/2011 | Bowman | |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0086562 A1 * | 4/2012 | Steinberg | G05D 23/1923 340/12.32 |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0273581 A1 * | 11/2012 | Kolk | F24F 11/006 236/91 D |
| 2012/0290230 A1 | 11/2012 | Berges Gonzalez et al. | |
| 2012/0310708 A1 | 12/2012 | Curtis et al. | |
| 2013/0060531 A1 | 3/2013 | Burke et al. | |
| 2013/0060720 A1 | 3/2013 | Burke | |
| 2013/0173064 A1 | 7/2013 | Fadell et al. | |
| 2013/0190940 A1 * | 7/2013 | Sloop | G05F 1/66 700/291 |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2014/0006314 A1 | 1/2014 | Yu et al. | |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0222396 A1 * | 8/2014 | Wen | G06F 17/5009 703/2 |
| 2014/0249876 A1 * | 9/2014 | Wu | G05B 15/02 705/7.12 |
| 2014/0312128 A1 * | 10/2014 | Matsuoka | G05B 15/02 236/51 |
| 2014/0337107 A1 | 11/2014 | Foster | |
| 2015/0112497 A1 * | 4/2015 | Steven | G06Q 50/06 700/291 |
| 2015/0227846 A1 | 8/2015 | Mercer et al. | |
| 2015/0267935 A1 | 9/2015 | Devenish et al. | |

(56) References Cited

U.S. PATENT DOCUMENTS

| | | | |
|---|---|---|---|
| 2015/0269664 | A1 | 9/2015 | Davidson |
| 2015/0310019 | A1 | 10/2015 | Royer et al. |
| 2015/0310463 | A1 | 10/2015 | Turfboer et al. |
| 2015/0310465 | A1 | 10/2015 | Chan et al. |

FOREIGN PATENT DOCUMENTS

| | | | |
|---|---|---|---|
| CA | 2832211 | 11/2012 | |
| DE | 3703387 | 8/1987 | |
| DE | 102011077522 | 12/2012 | |
| EP | 0003010 | 7/1979 | |
| EP | 2705440 | 3/2014 | |
| EP | 2496991 | 9/2014 | |
| GB | 1525656 | 9/1978 | |
| GB | 2238405 | 5/1991 | |
| JP | 2000-270379 | 9/2000 | |
| JP | 2004-233118 | 8/2004 | |
| JP | 2006-119931 | 5/2006 | |
| JP | 2007-133468 | 5/2007 | |
| JP | 2011-027305 | 2/2011 | |
| JP | 2012-080679 | 4/2012 | |
| JP | 2012-080681 | 4/2012 | |
| JP | 2013-020307 | 1/2013 | |
| WO | WO 03/102865 | 12/2003 | |
| WO | WO 03/104941 | 12/2003 | |
| WO | WO 2008/101248 | 8/2008 | |
| WO | WO 2009/085610 | 7/2009 | |
| WO | WO 2011/057072 | 5/2011 | |
| WO | WO 2012/112358 | 8/2012 | |
| WO | WO 2012/154566 | 11/2012 | |
| WO | WO 2013043863 A1 * | 3/2013 | ............ G05B 15/02 |
| WO | WO 2014/004148 | 1/2014 | |
| WO | WO 2014/182656 | 11/2014 | |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May, 19,2008, 15 pages, available at http://web.archive.orgi/web/20080519220643/bie.berkeley.edu/coolcalc/calculations.html.
Author Unknown, "Lifecycle Climate Footprint Calculator," Berkeley Institute of the Environment, Nov. 23, 2007, 6 pages, available at http://web.archive.org/web/20071123115832/http://bie/berkeley.edu/calculator.

Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the Em Algorithm, Biometrics, vol. 55, pp. 463-469, Jun. 1999.

(56) References Cited

OTHER PUBLICATIONS

Nest, "The Learning Thermostat," http://www.nest.com/, 2 pages, Jul. 15, 2013.

Nike.com, "Nike + FuelBand. Tracks your all-day activity and helps you do more . . . ," http://www.nike.com/us/en_us/c/nikeplus-f.. uelband, 7 pages, Jul. 15, 2013.

Rose, O. "Estimation of the Hurst Parameter of Long-Range Dependent Time Series," University of Wuirzburg, Institute of Computer Science, Research Report Series, Report No. 137, 15 pages, Feb. 1996.

Sawka, Michael N., et al., "Human Adaptations to Heat and Cold Stress," RTOMP-076, 16 pages, Oct. 2001.

Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.

Stoop, R., et al., "Calculation of Lyapunov exponents avoiding spurious elements," Physica D 50, pp. 89-94, May 1991.

Wang, Xiaozhe, et al. "Rule induction for forecasting method selection: meta-learning the characteristics of univariate time series," Faculty of information Technology, Department of Econometrics and Business Statistics, Monash University, pp. 1-34.

Wang, Xiaozhe, et al., "Characteristic-Based Clustering for Time Series Data," Data Mining and Knowledge Discovery, Springer Science & Business Media, LLC, vol. 13, pp. 335-364 (2006).

Wehrens, Ron, et al. "Self- and Super-organizing Maps in R: The kohonen Package," Journal of Statistical Software, vol. 21, Iss. 5, pp. 1-19, Oct. 2007.

Wikipedia, "Akaike information criterion," 6 pages, Aug. 17, 2012.

Wikipedia, "Mixture model," 10 pages, Oct. 7, 2012.

\* cited by examiner

PREDICTING FUTURE INDOOR AIR TEMPERATURE FOR BUILDING

CROSS-REFERENCE TO RELATED APPLICATION

This application claims priority to and the benefit of U.S. Provisional Patent Application No. 61/925,521, filed on Jan. 9, 2014, the disclosure of which is incorporated by reference herein in its entirety.

BACKGROUND

Field

The present disclosure relates generally to energy conservation and more specifically to determining thermodynamic properties of a building and estimating a future indoor air temperature for the building.

Description of the Related Art

Heating and cooling usage is often a significant driver of energy use. These loads are dependent upon customer-defined heating and cooling set points, which determine the thresholds for heating, ventilation, and air-conditioning (HVAC) system operation. Various efforts to reduce energy use associated with heating and cooling have been made. For instance, buildings may be equipped with smart HVAC systems including programmable thermostats which may be programmed with schedules of temperature set points (i.e., set point schedules). A set point refers to an indoor air temperature which the HVAC system of the building seeks to maintain by triggering HVAC system operation.

Set point schedules are made up of a series of set points that reflect a user's HVAC needs throughout the day. For example, in a home with a smart HVAC system, a user may attempt to save energy and reduce cooling costs by creating a schedule that increases a set point when the user expects to be away from home. For instance, a user may create a schedule by setting a set point of 72° F. during the morning when they are at home, a set point of 80° F. during the day when they are away at work, and another set point of 72° F. during the evening when they return home.

However, the schedules that users create often lead to inefficient energy consumption. Accordingly, there is a need to enable users to improve energy efficiency by optimizing set point schedules. Predicting future indoor air temperatures may aid in optimizing set point schedules.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
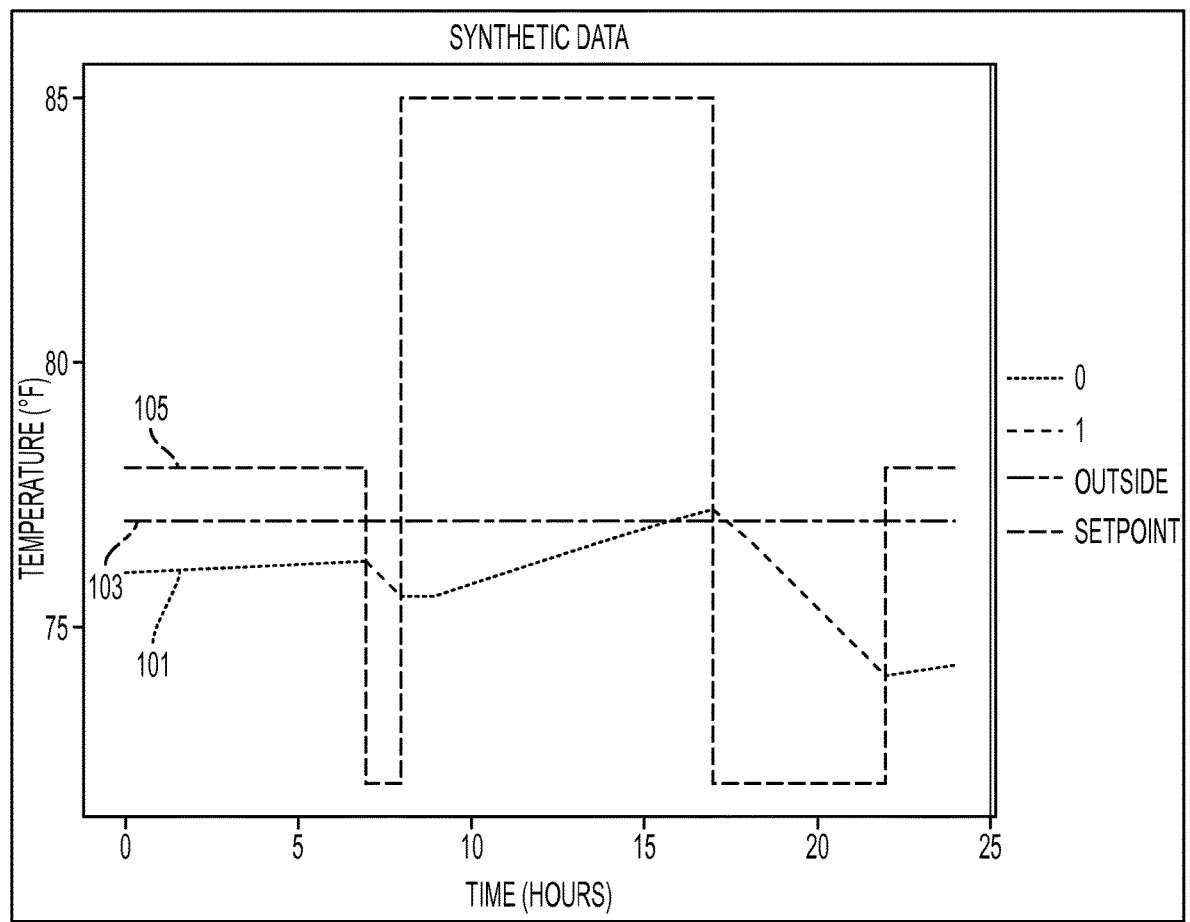
FIGS. 1, 2, 3, 4, and 5 illustrate changes in the indoor temperature for a building over time as well as outdoor temperature, a set point schedule, and an HVAC system state, according to various embodiments.

Embodiments may address at least some of the above problems and/or disadvantages and other disadvantages not described above. Also, embodiments are not required to overcome the disadvantages described above, and an embodiment may not overcome any of the problems described above.

An embodiment employs certain thermodynamic properties of a building to improve energy consumption of the building's HVAC system by optimizing a thermostat set point schedule. In particular, an embodiment learns certain thermodynamic properties of a building in order to predict future indoor air temperatures for the building.

According to an embodiment, a predicted future indoor air temperature for a building may be used for many purposes including: predicting the state of an HVAC system for the building at a future time; forecasting energy usage and energy costs; performing load shifting to reduce energy costs, predicating peak use events, etc. This will be described in greater detail below.

According to an embodiment, network connected thermostats (e.g., smart thermostats) may enable users to optimize energy efficiency by providing predicted future indoor air temperatures for buildings and other information related to set point schedule optimization. For example, if it is determined that a HVAC system of a building will be running during peak hours (e.g, a time when energy is more expensive), based on the predicted future indoor air temperature for the building and a set point schedule of the building, the set point schedule may be optimized by pre-cooling (or heating) the building during non-peak hours such that a desired indoor temperature may be maintained during the peak hours with minimal energy usage. This will be described in greater detail below.

A number of factors may influence the indoor temperature for a building. For instance, the time required for the HVAC system to bring the indoor temperature for a building to a desired temperature (i.e., a current set point) is influenced by the thermodynamic properties of the building and environmental conditions. According to an embodiment, the thermodynamic properties of the building may include the HVAC heating and cooling power of the building, the insulation properties of the building, and the effect of solar radiation on the building. The insulation properties of a building refer to properties (e.g., materials used in the building, the amount of insulation, the type of insulation, the size of windows and doors, the number of windows and doors, the type of windows and doors, vents, etc.) that affect how fast the indoor temperature moves toward the outdoor temperature. For example, the temperature in less insulated buildings will move toward the outdoor temperature more quickly than the temperature in better insulated buildings. The effect of solar radiation on a building refer to how fast solar radiation heats up the building, independent of outdoor temperature.

The environmental conditions may include an indoor temperature (i.e., an air temperature inside of the building), an outdoor temperature (i.e. an air temperature outside of the building), an intensity and duration of solar radiation on the building, precipitation, humidity, wind speed/direction, cloud cover, etc. However, the embodiment is not limited thereto.

The effects of different thermodynamic proprieties and environmental conditions on the indoor temperature for a building will be explained in further detail below with reference to FIGS. 1, 2, 3, 4, and 5. In particular, FIGS. 1, 2, 3, 4, and 5 illustrate changes in indoor temperature for a building over time as well as outdoor temperature, a set point schedule, and an HVAC system state, all of which, in combination with the thermodynamic properties of the building, influence the indoor temperature of the building.

Referring to the legend shown in FIGS. 1, 2, 3, 4, and 5, "0" indicates an OFF state of the HVAC system and "1" indicates an ON state of the HVAC system (i.e., a cooling state). The units of temperature are illustrated in degrees Fahrenheit (° F.) and the units of time are illustrated in hours. For purposes of description, time "0" corresponds to midnight and time "12" corresponds to noon.

Referring to FIG. 1, an idealized relationship (i.e., a "perfect world") between an indoor temperature 101 for a building, an outdoor temperature 103, a set point schedule 105, and an HVAC system state is illustrated in graph 100. As illustrated in FIG. 1, the outdoor temperature 103 is constant (i.e., 77° F.) and the set point schedule 105 varies according to the time of day (i.e., different set points are in effect at different times). The set point schedule 105 may be set by a user who is attempting to reduce cooling costs in his or her home. For instance, as illustrated in FIG. 1, the set point is set to 78° F. from midnight to 7 a.m. (e.g., when the user is asleep), set to 72° F. from 7 a.m. to 8 a.m. (e.g., when the user is awake and getting ready for work), set to 85° F. from 8 a.m. to 5 p.m. (e.g., when the user is away at work), set to 72° F. from 5 p.m. to 10 p.m. (e.g., when the user returns from work), and set to 78° F. from 10 p.m. to 7 a.m. (e.g., when the user is asleep).

As illustrated in FIG. 1, the indoor temperature 101 is influenced by the operation of the HVAC system, which is determined by the set point schedule 105 and the indoor temperature 101, as well as by the outdoor temperature 103, and the thermodynamic properties of the building. For example, from midnight to 7 a.m. when the cooling set point is 78° F. and the indoor temperature 101 is less than the cooling set point, the HVAC system remains in an OFF state (i.e., because no cooling is needed). However, because the indoor temperature 101 is less than the outdoor temperature 103 and due to the effect of solar radiation, the indoor temperature gradually increases until the set point changes to 72° F. and the HVAC system switches to an ON state to provide cooling.

The effects of warmer weather, varied weather, a stronger HVAC system (i.e., stronger air conditioning system), and weaker insulation (i.e., compared to FIG. 1), on the indoor air temperature will be described below with reference to FIGS. 2, 3, 4, and 5, respectively.

Figure 2:
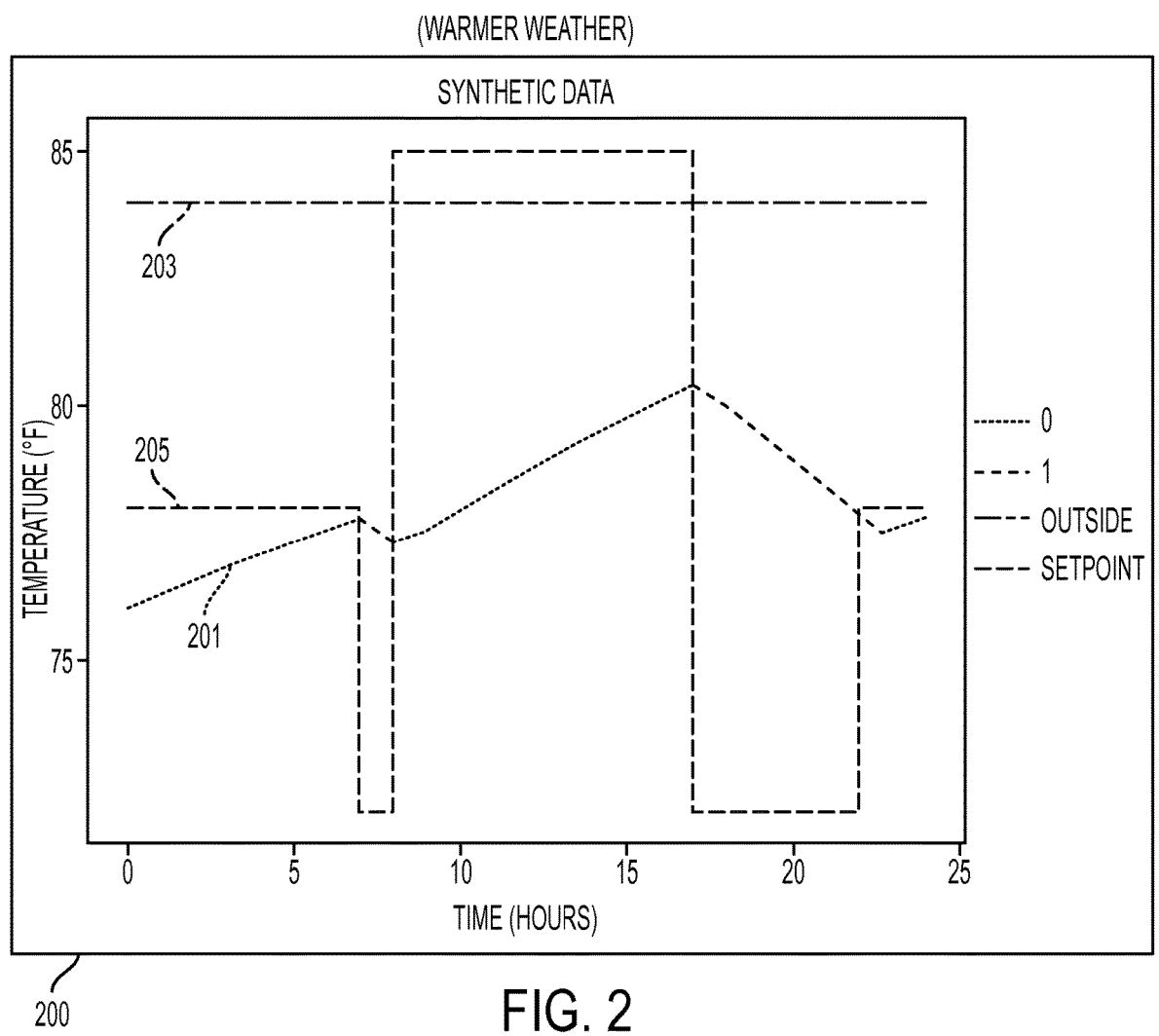

Referring to FIG. 2, an effect of warmer weather (i.e., compared to the weather associated with FIG. 1) on an indoor temperature 201 is illustrated in graph 200. As illustrated in FIG. 2, an outdoor temperature 203 is constant (i.e., 84° F.) and a set point schedule 205 is the same as the set point schedule 105 illustrated in FIG. 1. Because the outdoor temperature 203 is greater than the outdoor temperature 103 illustrated in FIG. 1, the indoor temperature 201 increases more rapidly in the example illustrated in FIG. 2 when the HVAC system is in an OFF state. Likewise, the indoor temperature 201 decreases more slowly in the example illustrated in FIG. 2 when the HVAC system is in an ON state, as compared with the indoor temperature 101 illustrated in FIG. 1.

Figure 3:
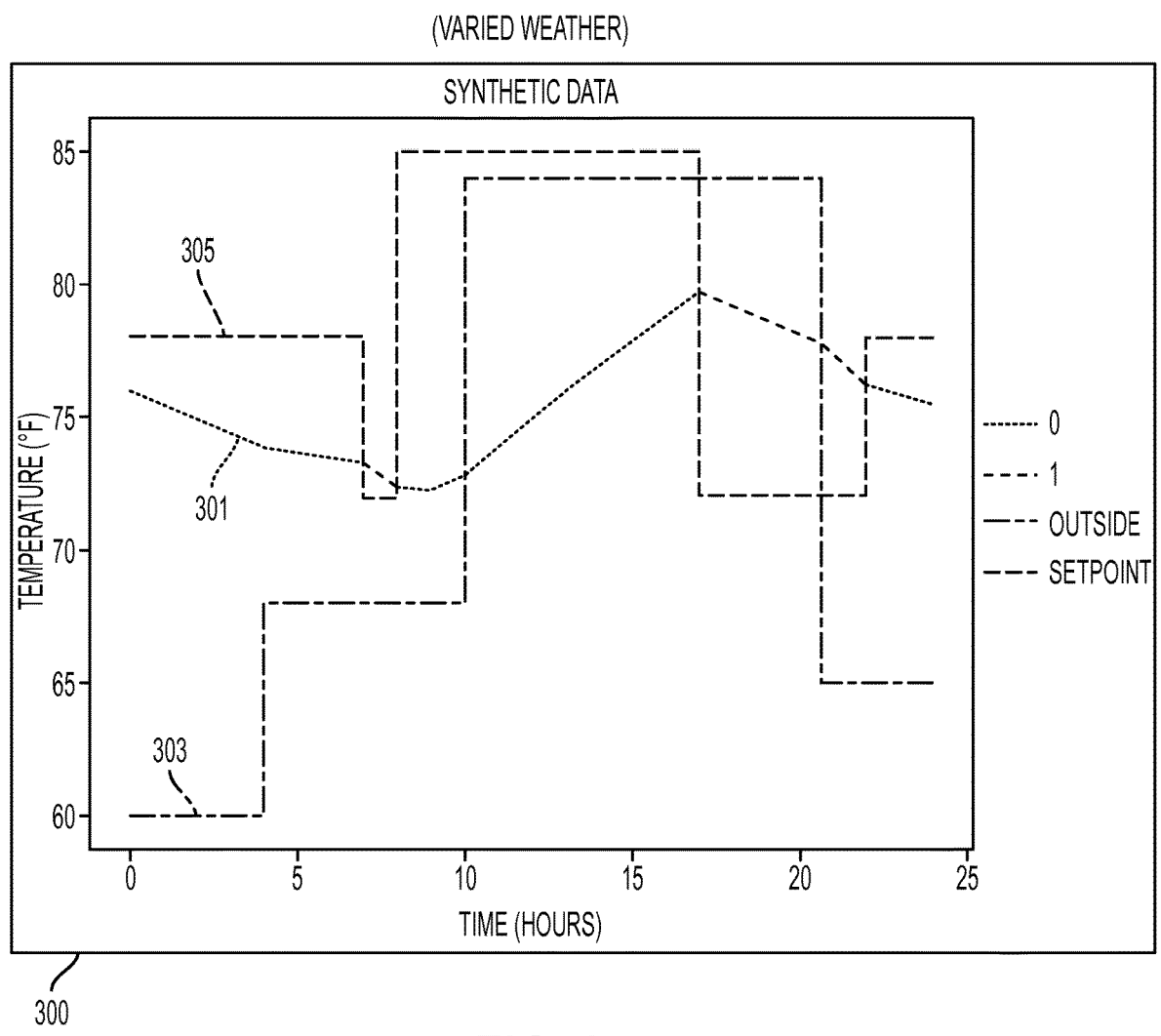

Referring to FIG. 3, an effect of varied weather (i.e., with respect to the constant weather of FIG. 1) on an indoor temperature 301 is illustrated in graph 300. As illustrated in FIG. 3, an outdoor temperature 303 varies from 60° F. to 84° F. throughout the day and a set point schedule 305 is the same as the set point schedule 105 illustrated in FIG. 1. As illustrated in FIG. 3, the varying outdoor temperature 303 causes the indoor temperature 301 to increase and decrease at different times. In contrast, as discussed above, the constant outdoor temperature 103 in the example illustrated in FIG. 1 only causes the indoor temperature 101 to gradually increase.

Figure 4:
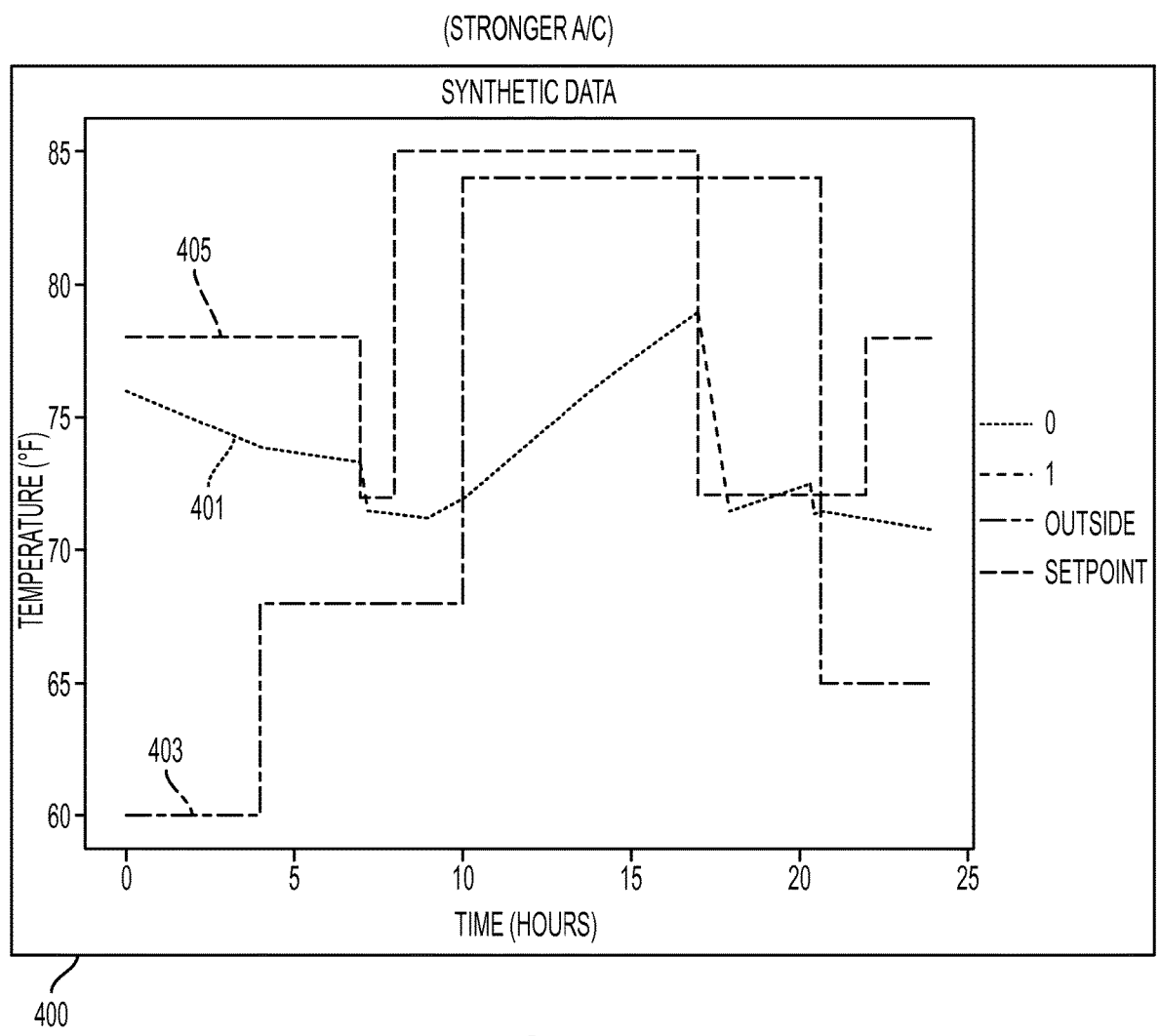

Referring to FIG. 4, an effect of a stronger air conditioning system (i.e., compared to the air conditioning system of FIG. 1) on an indoor temperature 401 is illustrated in graph 400. As illustrated in FIG. 4, an outdoor temperature 403 is the same as the outdoor temperature 303 illustrated in FIG. 3 and a set point schedule 405 is the same as the set point schedule 105 illustrated in FIG. 1. Because the air conditioning system of the building modeled in FIG. 4 is stronger than the air conditioning system of the building modeled in FIG. 1, the indoor temperature 401 decreases more rapidly than the indoor temperature 101 illustrated in FIG. 1 when the respective HVAC systems are in an ON state.

Figure 5:
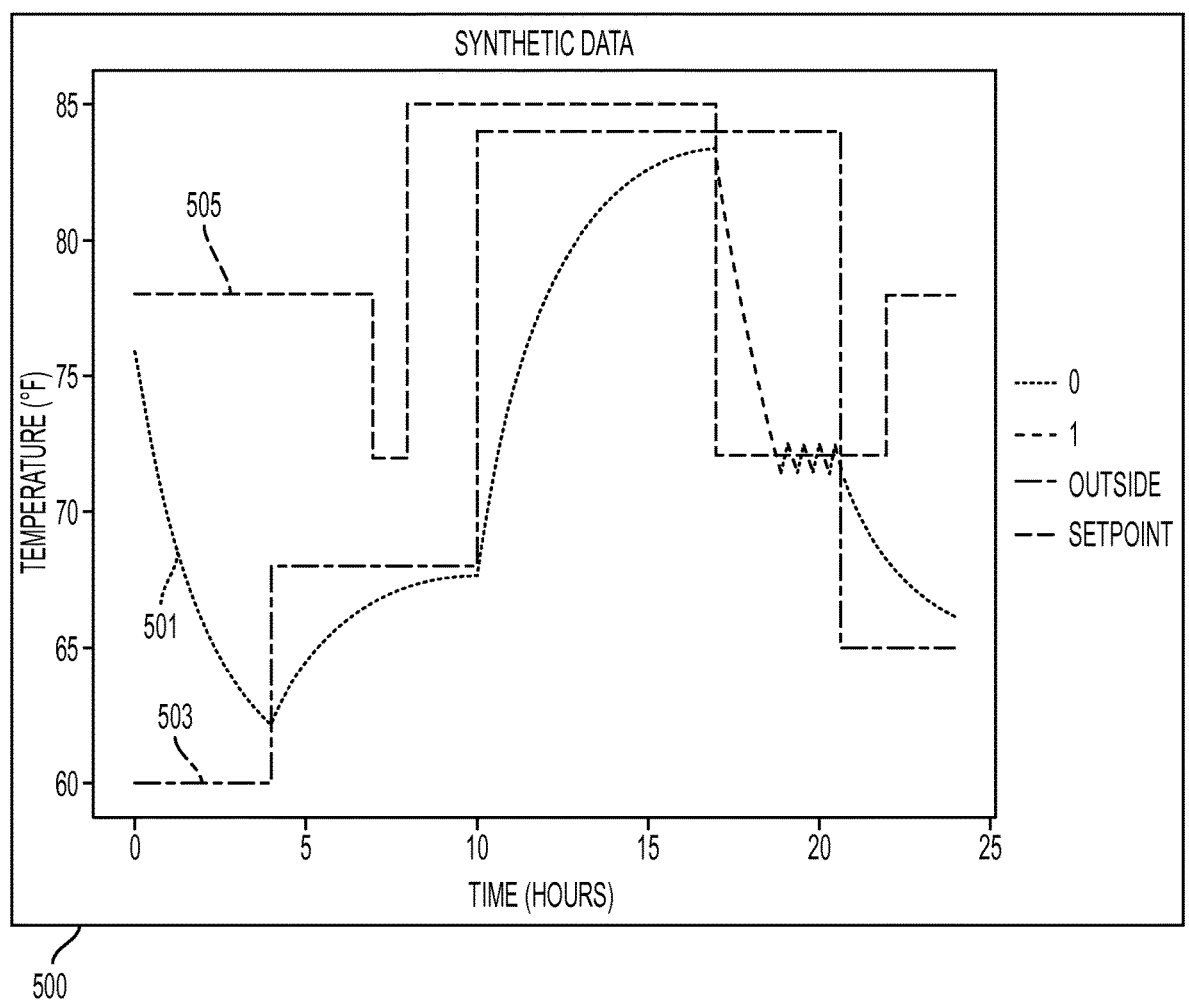

Referring to FIG. 5, an effect of weaker insulation (i.e., compared to the insulation of FIG. 1) on an indoor temperature 501 is illustrated in graph 500. As illustrated in FIG. 5, an outdoor temperature 503 is the same as the outdoor temperature 403 illustrated in FIG. 4 and a set point schedule 505 is the same as the set point schedule 105 illustrated in FIG. 1. Because the insulation of the building modeled in FIG. 5 is much weaker than the insulation of the building modeled in FIG. 1, the indoor temperature 501 is much more dependent the outdoor temperature 503 than the indoor temperature 101 illustrated in FIG. 1.

FIGS. 1, 2, 3, 4, and 5 are merely examples provided to assist in the understanding of the effect of environmental conditions on the indoor temperature for a building with respect to the thermodynamic properties of the building.

A system and method according to an embodiment learns thermodynamic properties of a building and predicts future indoor temperatures of a building based on forecasted environmental conditions, the learned thermodynamic properties, and a set point schedule.

Inefficiencies in energy usage of an HVAC system depends on the correlation of the set point schedule to the cost of energy at particular times of the day, the outdoor temperature, the indoor temperature, and the thermodynamic properties of the building. For example, inefficiencies may be caused by inefficient consumption due to natural outdoor and indoor temperatures or inefficient energy consumption during peak hours when energy is more expensive. For example, if a building is poorly insulated and the air temperature outside of the building is especially hot (e.g., a hot summer day) during peak hours, inefficiencies may be caused by operating the HVAC system (i.e., the air conditioning) for a large amount of time during the peak hours. In contrast, according to an exemplary embodiment, a building may be pre-cooled before the peak hours to minimize energy usage during the peak hours, based on the forecasted environmental conditions, the learned thermodynamic properties, and the set point schedule of the building. According to an embodiment, the learned thermodynamic properties and the predicted future indoor temperature for a building may be used for many purposes. For example, they may be used for: (1) simulations; (2) retrospective analysis; (3) forecasting/energy rate plan optimization; (4) set point schedule optimization; (5) demand response (DR) targeting; and (6) inefficiency detection. However, these are merely examples and the embodiments are not limited thereto. The above examples will be described in further detail below.

Figure 6:
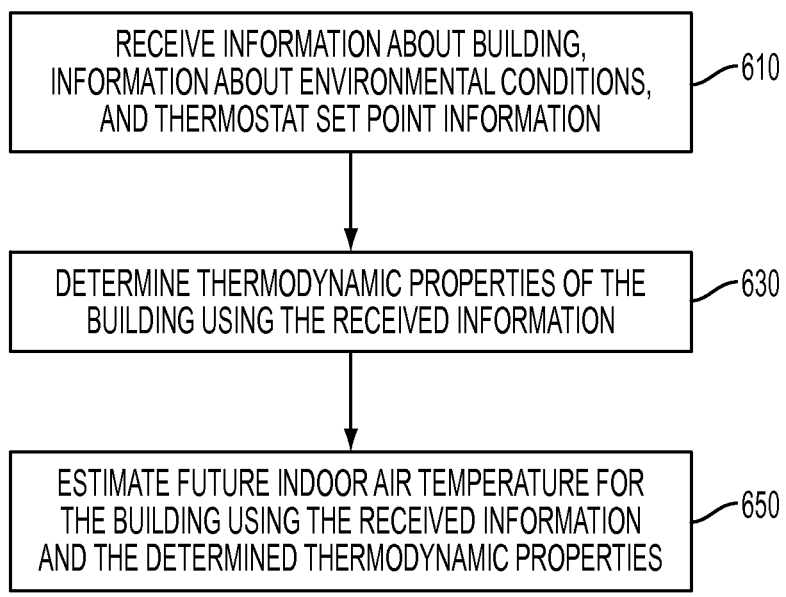
FIG. 6 is a flow diagram illustrating a process for estimating a future indoor air temperature for a building, according to an embodiment.

FIG. 6 is a flow diagram illustrating a process for estimating a future indoor air temperature for a building, according to an embodiment.

Referring to FIG. 6, information about a building, information about environmental conditions, and thermostat set point information (e.g., a set point schedule) may be received in block 610. The information may be received from a client device such as a network thermostat, mobile device, or other device, from a utility company providing energy to the building (e.g., from a server or database maintained by the utility), from a thermostat manufacturer, from a third-party database, or from any other source, and will be described in further detail below with reference to FIGS. 9, 10, and 11. The information received from the client device may also be time coded (e.g., time stamped) such that the received information is associated with a particular time. In some embodiments, the information may be associated with a time code after it is received from the client device.

According to an embodiment, the information about the building may include information about the HVAC system of the building, the square footage or cubic footage of the building, the location of the building, the materials the building is constructed from, blueprints of the building (e.g., a floor plan), etc.

Accordingly to an embodiment, the information about environmental conditions may include information about past (or present) environmental conditions including outdoor temperatures, indoor temperatures, solar radiation, humidity, cloud cover, etc., and information about future environmental conditions including predicted outdoor temperatures, predicted solar radiation, predicted humidity, predicted cloud cover, etc. However, these are merely examples, and information about additional environmental conditions may be provided. Information about the environmental conditions may include information at certain time intervals. These time intervals may be any resolution (e.g., seconds, minutes, hours, etc.). If certain information is not available at a desired time interval, the information may be generated by an interpolation of available information. This is will described in further detail below with reference to FIGS. 7 and 8.

According to an embodiment, the thermostat set point information may include past set point schedules and future set point schedules.

Next, in block 630, thermodynamic properties of the building are determined using the received information. In an embodiment, the thermodynamic properties may include insulation properties of the building, HVAC system properties of the building, and the effect of solar radiation on the building. However, these are only exemplary, and additional thermodynamic properties may be determined. The process of determining the thermodynamic properties will be discussed in further detail below with reference to FIG. 7.

Next, in block 650, the future indoor air temperature for the building is estimated using the received information and the determined thermodynamic properties. This future indoor air temperature may be transmitted to and displayed on a client device of the user, which corresponds to the building. This will be described in further detail below.

Figure 7:
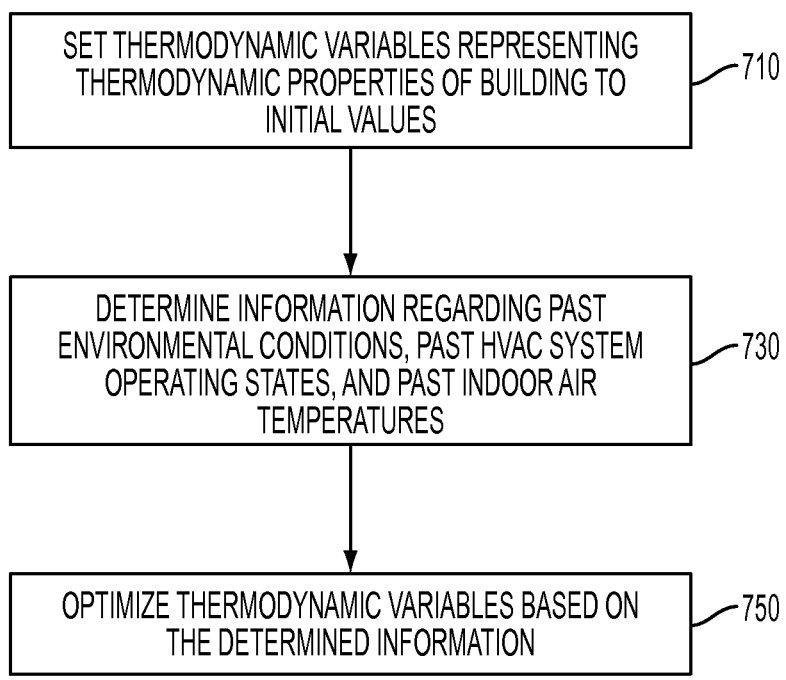
FIG. 7 is a flow diagram illustrating a process for determining thermodynamic properties of a building, according to an embodiment.

FIG. 7 is a flow diagram illustrating a process for determining thermodynamic properties of a building, according to an embodiment. In particular, as described in greater detail below, thermodynamic variables representing thermodynamic properties of a building are optimized to minimize the error between the determined thermodynamic variables and the actual thermodynamic properties of the building. The optimized thermodynamic variables correspond to the determined the thermodynamic properties as described above with reference to block 630 of FIG. 6.

Referring to FIG. 7, thermodynamic variables representing properties of the building are set to initial values. For instance, $\alpha$ may represent the insulation properties of the building, $\beta$ may represent the HVAC system properties of the building, and $\gamma$ may represent the effect of solar radiation on the building. However, the thermodynamic variables are not limited to the above, and additional thermodynamic variables representing different thermodynamic properties of the building or alternative combinations of thermodynamic variables may be used. Furthermore, multiple variables representing each of the insulation properties of the building, the HVAC system properties of the building, and the effect of solar radiation on the building may be used.

According to an embodiment, the initial values may be default values and/or selected based on previously determined thermodynamic variables for buildings similar to the current building (i.e., the building for which the thermodynamic variables are being calculated). Buildings having a similar HVAC system, a similar square footage or cubic footage, a similar location, similar building materials, similar blueprints, etc., to that of the current building may be determined to be buildings similar to the current building, According to an embodiment, to determine which buildings are similar to the current building, the received information about the current building may be compared to stored information about other buildings whose thermodynamic properties have already been determined. However, the embodiments are not limited thereto and the thermodynamic variables can be set to random initial values, or any other initial values that are conducive to optimizing the variables.

Next, in block 730, information regarding past environmental conditions, past HVAC system operating states, and past indoor air temperatures may be determined. For example, as described in greater detail below, the information may include data that has been measured and stored and data that is estimated based on past information. The information regarding past environmental conditions, past HVAC system operating states, and past indoor air temperatures are described above with reference to block 610 of FIG. 6. According to an embodiment, the past environmental conditions may be measured and stored in a database or determined based on past weather information (e.g., a weather forecast). The past HVAC operating states and the past indoor air temperatures may be measured and stored in a database.

Next, in block 750, the thermodynamic variables are optimized based on the determined past information. In particular, the thermodynamic variables α, β, and γ are optimized using an optimization method to minimize error between a calculated indoor air temperature at a time i+1 (i.e., a time previous to a current time) and a measured indoor air temperature at the time i+1. According to one embodiment, the indoor air temperature at time i+1 is calculated using the model set forth below in Equation 1:

$$indoor\_temp_{i+1} = \alpha * indoor\_temp_i + (1-\alpha) * (outdoor\_temp_i - HVAC\_state_i * \beta + solar\_radiation_i * \gamma)$$ [Equation 1]

In Equation 1, the $indoor\_temp_{i+1}$ is the calculated indoor air temperature for the building at the time i+1, the $indoor\_temp_i$ is an indoor air temperature for the building at a time i, the $outdoor\_temp_i$ is an outdoor air temperature for the building at the time i, the $HVAC\_state_i$ is an operating state of an HVAC system of the building at the time i, and the $solar\_radiation_i$ corresponds to solar radiation on the building at the time i. The time i and the time i+1 may both be times previous to a current time. As set forth above, the optimized thermodynamic variables α, β, and γ correspond to the insulation properties of the building, the HVAC system properties of the building, and the effect of solar radiation on the building, respectively.

As explained in further detail below, the time i and the time i+1 represent two adjacent time steps in the model. For example, in the model set forth above in Equation 1, the indoor temperature at a next time step (i.e., "i+1") is calculated using data from a current time step (i.e., "i"). In order to increase the accuracy of the optimized thermodynamic variables, data corresponding to a large number of time steps (i.e., i+1, i+2, i+3 . . . ) is used in the model. That is to say, as the number of time steps used in past data increases, the expected error (i.e., between the calculated indoor temperature and the measured indoor temperature) in a previously unseen data set decreases.

The error is defined as a sum of the squared differences between what the model predicts the indoor temperature to be and the actual observed or determined indoor temperature at a same time. According to an embodiment, when all of the past data components (i.e., past information) are known for all time steps for the model, the problem of minimizing the error is a "supervised learning problem." In this case, the optimization method may be any optimization technique that minimized the error. For instance, according to an embodiment, the optimization method may be a Gradient Descent Method or Newton's Method. However, the embodiments are not limited thereto.

When one or more of the past data components are missing for some or all of the time steps for the model, the problem of minimizing the error is a "semi-supervised learning problem." In this case, there are many different methods that can be used to minimize the error.

According to one embodiment, if there are enough time steps for which there is no missing data, one method is to simply ignore the times steps for which there is missing information and proceed with the supervised learning approach discussed above.

According to another embodiment, another method is to fill in the missing information using a one-time deterministic process and then proceed with the supervised learning approach discussed above. For example, missing information for past indoor or outdoor temperatures may be replaced by interpolations of surrounding information and previous historical data, as discussed above with reference to FIG. 6. Missing information for solar radiation may be estimated based on the time of day and whether the sun was out. For example, as set forth above, if certain information is not available at a desired time interval (i.e., i, i+1, etc.), the information may be generated by an interpolation of available surrounding information. For instance if the outdoor temperature (i.e., "$outdoor\_temp_i$") is known at time i and time i+2, but is unknown at time i+1, the outdoor temperature may be an interpolation of the outdoor temperature at time i and time i+2. However, this is merely an example and the embodiments are not limited thereto.

According to another embodiment, another method employs an iterative approach, such as Expectation-Maximization. This approach starts with an initial set of parameters and iteratively alternates between inputting the missing information using the current model parameters and relearning the parameters given the inputted information using a supervised learning approach.

According to an embodiment, the past information may be transformed into a format that can be utilized by Equation 1 by matching the past information at each time step.

Figure 8:
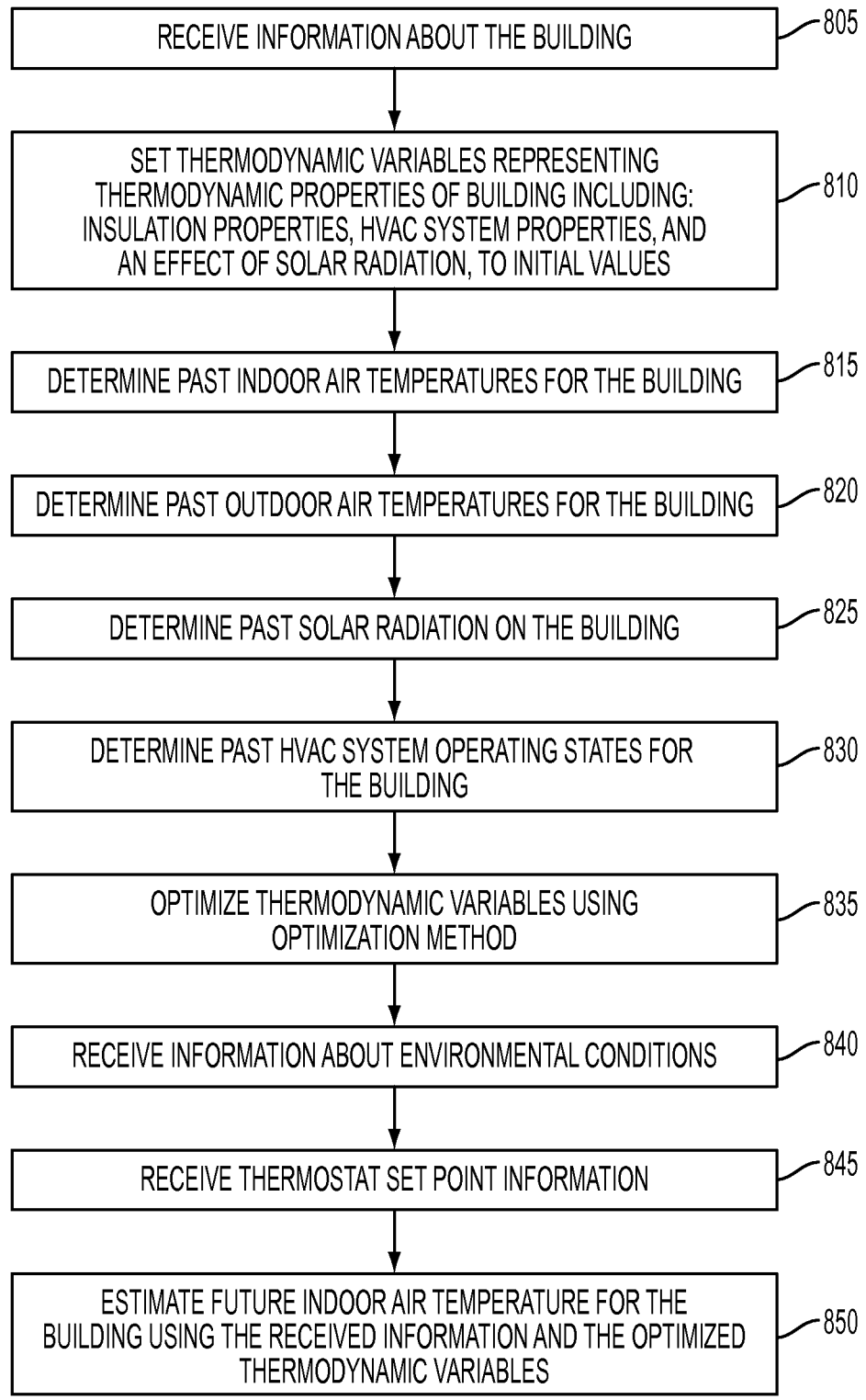
FIG. 8 is a flow diagram illustrating a process for estimating a future indoor air temperature for a building, according to an embodiment.

FIG. 8 is a flow diagram illustrating a process for estimating a future indoor air temperature for a building, according to an embodiment.

Referring to FIG. 8, information about the building is received in block 805. Next, in block 810, thermodynamic variables representing thermodynamic properties of the building are set to initial values. Next, in block 815, past indoor air temperatures for the building are determined. Next, in block 820, past outdoor air temperatures for the building are determined. Next, in block 825, past solar radiation on the building is determined. Next, in block 830, past HVAC system operating states for the building are determined. Next, in block 835, the thermodynamic variables are optimized using an optimization method. These have been described in detail above with reference to FIGS. 6 and 7.

Next, in block 840, information about environmental conditions is received. As discussed above, the information about environmental conditions includes information about future environmental conditions including predicted outdoor temperatures, predicted solar radiation, predicted humidity, predicted cloud cover, etc. This information may include, e.g., a weather forecast. As described above with reference to block 610 of FIG. 6, the information may be received from a client device such as a network thermostat, mobile device, or other device, from a utility company providing energy to the building (e.g., from a server or database maintained by the utility), from a thermostat manufacturer, from a third-party database, or from any other source.

Next, in block 845 thermostat set point information is received. As discussed above, this may include a future set point schedule. For instance, the future set point schedule may be a set point schedule which has been programmed by a user. Alternatively, the set point schedule may be inferred from data such as energy usage information.

Next, in block 850, a future indoor air temperature for the building is estimated using the received information and the optimized thermodynamic variables. In an embodiment, the future indoor air temperature at a time j+1 (i.e., a time subsequent to a current time), is estimated using the model set forth below in Equation 2:

$$\text{indoor\_temp}_{j+1} = \alpha * \text{indoor\_temp}_j + (1-\alpha) * (\text{outdoor\_temp}_j - \text{HVAC\_state}_j * \beta + \text{solar\_radiation}_j * \gamma) \quad \text{[Equation 2]}$$

In Equation 2, the indoor_temp$_{j+i}$ is the calculated future indoor air temperature inside of the building at the time j+1, the indoor_temp$_j$ is an indoor air temperature for the building at a time j, the outdoor_temp$_j$ is an outdoor air temperature for the building at the time j, the HVAC_state$_j$ is an operating state of an HVAC system of the building at the time j, the solar_radiation$_1$ corresponds to solar radiation on the building at the time j, α corresponds to the determined insulation properties of the building, β corresponds to the determined HVAC system properties of the building, and γ corresponds to the determined effect of solar radiation on the building. The time j+1 may be a time subsequent to a current time (i.e., a future time).

Figure 9:
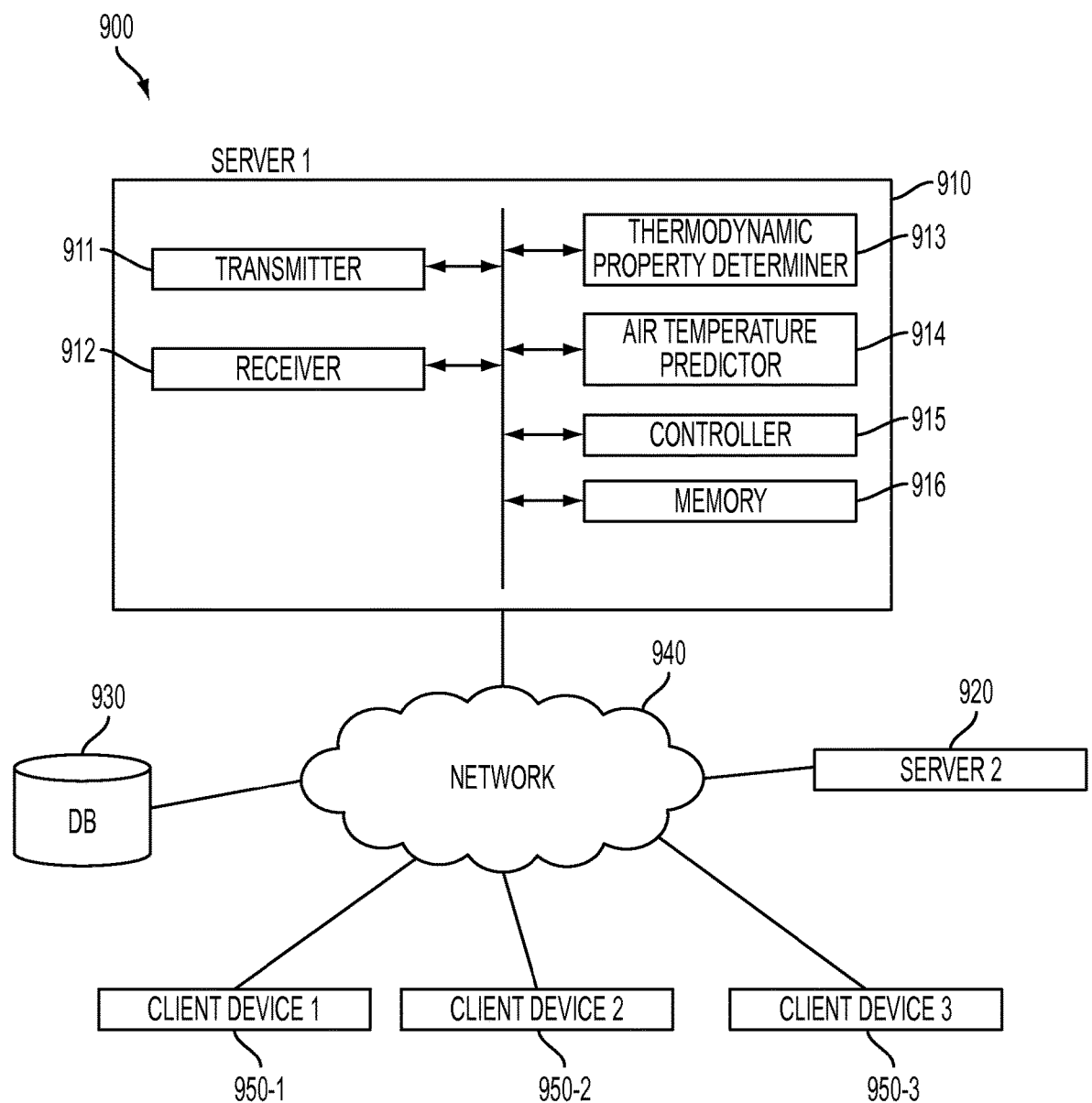
FIG. 9 is a block diagram illustrating a system for determining thermodynamic properties of a building and estimating a future indoor air temperature for the building, according to an embodiment.

FIG. 9 is a block diagram illustrating a system for determining thermodynamic properties of a building and estimating a future indoor air temperature for the building, according to an embodiment. In particular, FIG. 9 illustrates an embodiment of a network 900 including servers 910, 920 upon which the system may be implemented and client devices 950-1, 950-2, 950-3 that communicate with the servers 910, 920. The client devices 950-1, 950-2, 950-3 will be described in further detail below with reference to FIG. 10. Server 1 910 includes a transmitter 911, a receiver 912, a thermodynamic property determiner 913, an air temperature predictor 914, a controller 915, and a memory 916. The thermodynamic property determiner 913, the air temperature predictor 914, and the controller 915 may include at least one of a processor, a hardware module, or a circuit for performing their respective functions. Although not illustrated, server 2 920 may be similarly embodied. The client devices 950-1, 950-2, 950-3 communicate across the Internet or another wide area network (WAN) or local area network (LAN) 940 with server 1 910 and server 2 920. Server 1 910 and server 2 920 may also communicate with database 930 across the Internet or another wide area network (WAN) or local area network (LAN) 940.

The thermodynamic property determiner 913, the air temperature predictor 914, the controller 915, and the memory 916 operate to execute instructions, as known to one of skill in the art. The term "computer-readable storage medium" as used herein refers to any tangible medium, such as a disk or semiconductor memory, that participates in providing instructions to the thermodynamic property determiner 913, the air temperature predictor 914, or the controller 915 for execution.

According to an embodiment, one or both of server 1 910 and server 2 920 may implement the system. For example, server 1 910 and/or server 2 920 may be located at a utility company, a third-party site, or any other location and may be configured to receive information, from the client devices 950-1, 950-2, 950-3, database 920, or another source (e.g., the utility company, a thermostat manufacturer, a third-party database, or any other source), regarding information about a building, information about environmental conditions, and thermostat set point information. Server 1 910 and/or server 2 920 may determine thermodynamic properties of the building based on the received information, estimate a future indoor air temperature for the building using the received information and the determined thermodynamic properties, and communicate the future indoor air temperature to the client devices 950-1, 950-2, 950-3 and/or to the database 930, the utility company, the thermostat manufacturer, a third-party database, or any other source. However, this is merely exemplary and the system may be implemented on a single server or on more than two servers. Further, the database 930 may be optionally omitted.

Additionally, the determined thermodynamic properties and/or additional information may be communicated to the client devices 950-1, 950-2, 950-3.

Figure 10:
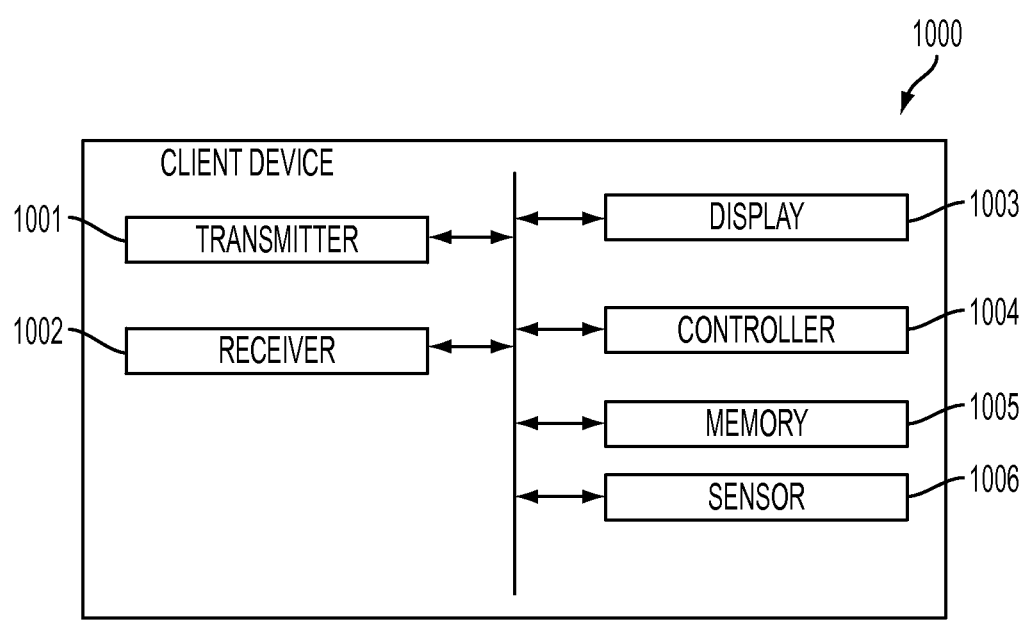
FIG. 10 is a block diagram illustrating a client device, according to an embodiment.

FIG. 10 is a block diagram that illustrates an embodiment of a client device 1000 upon which an embodiment may be implemented. The client device 1000 includes a transmitter 1001, a receiver 1002, a display 1003, a controller 1004, a memory 1005, and a sensor 1006. The transmitter 1001 may be configured to transmit information about a building, information about environmental conditions, and/or thermostat set point information to server 1 910, server 2 920, and/or database 930. The receiver may be configured to receive, from server 1 910, server 2 920, and/or database 930, information including an estimated future indoor air temperature, determined thermodynamic properties, and additional information. The additional information will be described in further detail with reference to FIGS. 13A, 13B, and 13C.

The controller 1004 and the memory 1005 operate to execute instructions, as known to one of skill in the art. The controller 1004 may include at least one of a processor, a hardware module, or a circuit for performing its respective functions. The display 1003 may be configured to display the received information. Further, the display 1003 may be a touchscreen display and may act as an input device for interacting with a user (e.g., an occupant of the house which the client device is installed in).

The sensor 1006 may include a plurality of different sensors. Accordingly to an embodiment, the sensor 1006 may include at least one indoor air temperature sensor (e.g., mounted inside of a building), at least one outdoor air temperature sensor (e.g., mounted outside of the building), and at least one solar radiation sensor (e.g., mounted outside of the building). However, the embodiment is not limited thereto, and the sensor 1006 may include additional environmental sensors. The sensor 1006 will be described in further detail below with reference to FIG. 11.

The client device 1000 may connect to the network 940 using wireless protocols, such as 802.11 standards, Bluetooth®, or cellular protocols, or via physical transmission media, such as cables or fiber optics.

The client device 1000 may be embodied in many different forms such as a smartphone, a mobile device, a thermostat, a computer, a device having a graphical UI (GUI) from which a thermostat set point can be selected or adjusted, etc. The GUI may be accessed through an application installed on a user's smartphone or through a browser displaying the user's utility account. Therefore, the user (e.g., utility customer) may be able to remotely control his or her thermostat.

Figure 11:
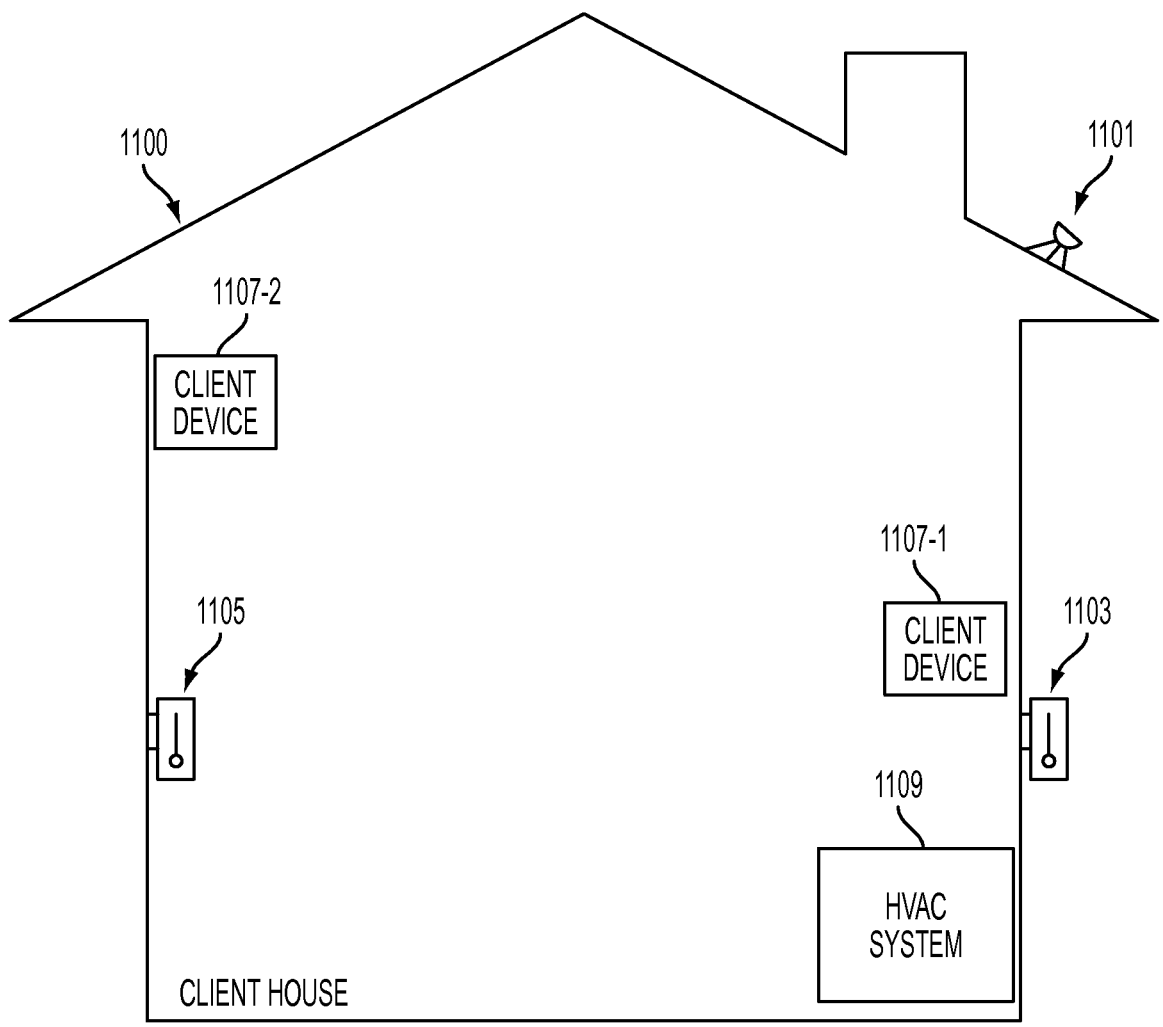
FIG. 11 is a block diagram illustrating a building having installed client devices, according to an embodiment.

FIG. 11 is a block diagram illustrating a building having an installed client device, according to an embodiment. In particular, FIG. 11 illustrates a user's house (i.e., client house 1100), according to an embodiment. However, the building is not limited to a house and the embodiments may be applied to any type of building.

Referring to FIG. 11, a client house 1100 including client devices 1107-1 and 1107-2 is illustrated. The client house 1100 may include an HVAC system 1109, a solar radiation sensor 1101 mounted on the roof the client house 1100, an outdoor air temperature sensor 1103 mounted on an exterior wall of the client house 1100, an indoor air temperature sensor 1105 mounted on an interior wall of the client house 1100, and the client devices 1107-1 and 1107-2. The solar radiation sensor 1101 may be configured to measure the solar radiation on the client house 1100. The outdoor air temperature sensor 1103 may be configured to measure the air temperature outside of the client house 1100. The indoor air temperature sensor 1105 may be configured to measure the air temperature inside of the client house 1100. However, the embodiment is not limited thereto, and additional or fewer sensors may be included. For example, the client house 1100 may include additional indoor air temperatures sensors 1105 so as to obtain a more accurate determination of the air temperature inside of the client house 1100. Additionally, the client house 1100 may include additional solar radiation sensors 1101 or outdoor air temperature sensors 1103. Further, according to an embodiment, the solar radiation sensor 1101 and/or the outdoor air temperature sensor 1103 may be optionally omitted. In this example, the solar radiation on the client house 1100 and/or air temperature outside of the house may be determined based on weather information including, e.g., a weather forecast. The client house 1100 may also include other types on environmental sensors such as humidity sensor. The sensors 1101, 1103, and 1105 may be configured to communicate their respective measurements to the client device 1107-1 and/or the client device 1107-1.

As shown in FIG. 11, the client house 1100 includes two client devices 1107-1 and 1107-2. However, the embodiment is not limited thereto. For example, the client house 1100 may include one client device or more than two client devices. Furthermore, the sensors 1101, 1103, 1105 (e.g., the indoor air temperature sensor) may be integrated in the client devices 1107-1 and 1107-2.

Figure 12:
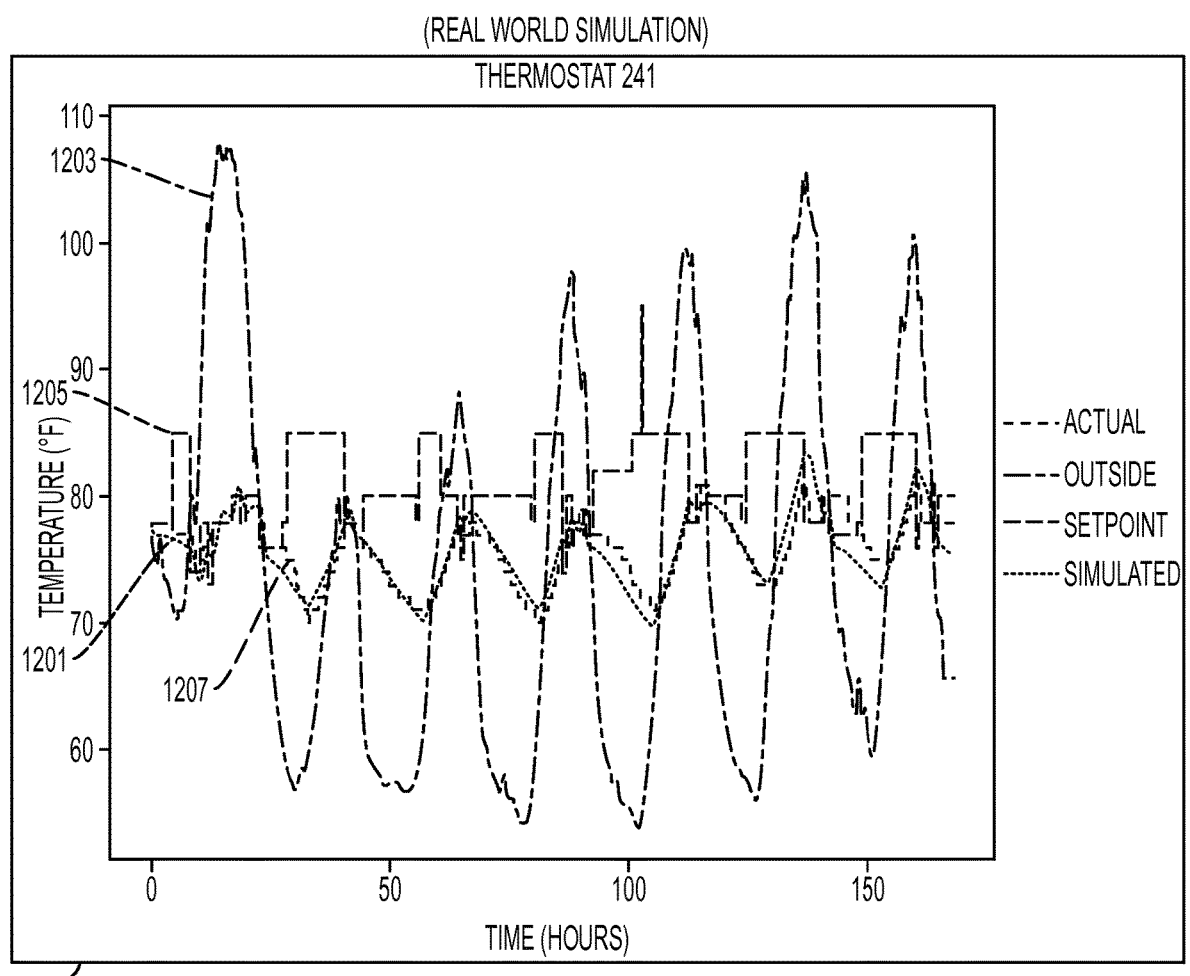
FIG. 12 illustrates estimated and actual indoor temperatures for a building over time, as well as outdoor temperature and a set point schedule, according to an embodiment.

FIG. 12 illustrates a real-world simulation according to the above-described embodiments. Referring to FIG. 12, graph 1200 illustrates the relationship between the actual (i.e., measured) indoor temperature 1201 for a building, the simulated indoor temperature 1207 for the building, the outdoor temperature 1203, and the set point schedule 1205. Graph 1200 may be shown on the client device 1000.

As set forth above, the above-described embodiments may be used for many purposes including, e.g., (1) simulations; (2) retrospective analysis; (3) forecasting/energy rate plan optimization; (4) set point schedule optimization; (5) demand response (DR) targeting; and (6) inefficiency detection. These purposes are explained in further detail below.

(1) Simulations

According to an embodiment, the state of an HVAC system (i.e., whether the system is off or on) may be predicted at any future time (e.g., some point during the day) based on the estimated future indoor temperature corresponding to that future time. This information may be used in a variety of simulations such as, but not limited to, determining usage for a household at a particular time (e.g., a peak time or time period with high energy rates), predicting energy usage costs, or determining usage for a number of customers at various times in order to determine when a peak event should be called.

(2) Retrospective Analysis

According to an embodiment, a retrospective analysis of a network thermostat user's energy consumption may be conducted using determined thermodynamic properties of the user's home. For example, according to a result of the retrospective analysis, the correlation between past thermostat set point schedules and past energy consumption can be presented to a user. Furthermore, a reduction/increase in energy usage or the cost of the energy usage based on a suggested modification to the set point schedule can be calculated and provided to a user. Accordingly, energy saving tips can be highly targeted to network thermostat users. This will be explained in further detail with reference to FIG. 13A.

(3) Forecasting/Energy Rate Plan Optimization

According to an embodiment, a network thermostat user's energy consumption may be estimated by forecasting (i.e., predicting) the runtime of the HVAC system based on the estimated future indoor air temperature and thermostat set point settings. Accordingly, energy savings tips can be highly targeted to network thermostat users. Furthermore, according to an embodiment, the forecasted runtime may be used to determine an optimal individualized rate plan. For example, a utility company may offer a user (i.e., a utility customer) three different rate plans including a flat rate plan, a peak rate plan, and staggered rate plan. Accordingly to an embodiment, the forecasted runtime may be used to estimate energy costs under each plan by forecasting energy consumption under each plan (not illustrated).

(4) Set Point Schedule Optimization

An embodiment relates to optimizing a set point schedule. For example, by creating schedules which take advantage of indoor and outdoor temperature fluctuations and determined thermodynamic properties of a building, overall energy consumption may be reduced.

According one embodiment, a set point schedule programmed by a user may be optimized. Accordingly to another embodiment, tips to optimize a set point schedule may be provided to the user. This will be explained in further detail with reference to FIG. 13C. According to another embodiment, a number of optimized set point schedules (e.g., for different temperature ranges) may be provided to the user. However, these are merely examples, and the embodiments are not limited thereto.

As another example, by learning the rate of cooling (or heating), pre-cooling (or pre-heating) may be performed during non-peak hours such that a desired indoor temperature (i.e., set point) may be maintained during peak hours with minimal energy usage. For example, a user may have a rate plan that charges more for energy between the hours of 3 p.m. and 7 p.m. than the other hours in the day. Accordingly, by transferring energy usage to a cheaper time of the day (i.e., load shifting), energy costs may be reduced.

As yet another example, the rate of cooling and heating may be learned in order to program an HVAC system to achieve desired indoor temperatures at set point times (i.e., though pre-heating or pre-cooling), rather than starting heating or cooling at the set point times.

(5) Demand Response (DR) Targeting

An embodiment relates to improving participation, improving comfort, and/or reducing costs associated with DR events. For example, during certain peak use events, energy systems may not be able to meet energy demand or energy prices may spike. For example, during a heat wave or when a power plant needs to be taken offline for maintenance, blackouts, brownouts, or energy price spikes may occur due to shortages in energy. Accordingly, during a peak use event, a utility company may initiate a DR event. A DR event refers to actions that are taken to reduce energy demand during these peak use events.

For example, a DR event may involve remotely controlling utility customers' thermostats to reduce energy consumption of heating/cooling systems during a peak use event, either by cycling heating/cooling systems off for a period of time or by adjusting a thermostat set point.

Utility companies may offer financial incentives to utility customers who participate in DR events during peak use events. Although all customers may be included in a DR program, it may not be cost effective to include every utility customer in the DR program because, regardless of the DR event, a certain buildings or customers may not be adding to the demand at the same rate (e.g., low energy users).

Therefore, an embodiment relates to determining how much a user (i.e., utility customer) participating in a DR event should be compensated or if they should be compensated at all. For example, the amount of compensation may be based on how much energy was saved based on a particular user's participation in a DR event. That is, the amount of energy that a participating user used during a DR event may be compared with a predicted amount of energy the user would have used during the DR event if they did not participate. Furthermore, the load shifting described above may be used to shift energy loads away from the DR event to achieve utility customers' intended indoor temperature during the DR event without consuming energy during the DR event, or by consuming minimal energy during the DR event.

(6) Inefficiency Detection

An embodiment relates to determining whether a building is energy efficient. For example, the determined thermodynamic properties for the building may be compared to the thermodynamic properties for other buildings to determine the relative efficiency of the building. In some cases, the system may identify a set of buildings that are similar to a particular building, determine the thermodynamic properties of the set similar buildings (e.g., the average or median value for each thermodynamic property) and compare the thermodynamic properties of the set of similar building to the thermodynamic properties the particular building.

Furthermore, additional costs due to the thermodynamic inefficiencies may be calculated. According to an embodiment, the calculated additional costs attributable to the thermodynamic inefficiencies, targeted savings programs, and/or energy related rebate programs may be provided to a user. For example, in a home with poor insulation (e.g., the thermodynamic properties for insulation are worse than 75% of the homes in the set of similar homes), a message may be provided to a user informing them that their home is only 25% efficient compared to similar homes, and that this inefficiency is costing them an estimated $1,500 dollars a year in energy costs based on their energy usage. Furthermore, the message may include suggestions for improving efficiency (e.g., install new insulation, install new windows, etc.) and provide information regarding any related rebate programs (e.g., tax credits). Still further, the message may include suggestions of local companies that provide services for improving efficiency (e.g., a local window company).

The above-discussed purposes are merely examples and the embodiments are not limited thereto.

Figure 13A:
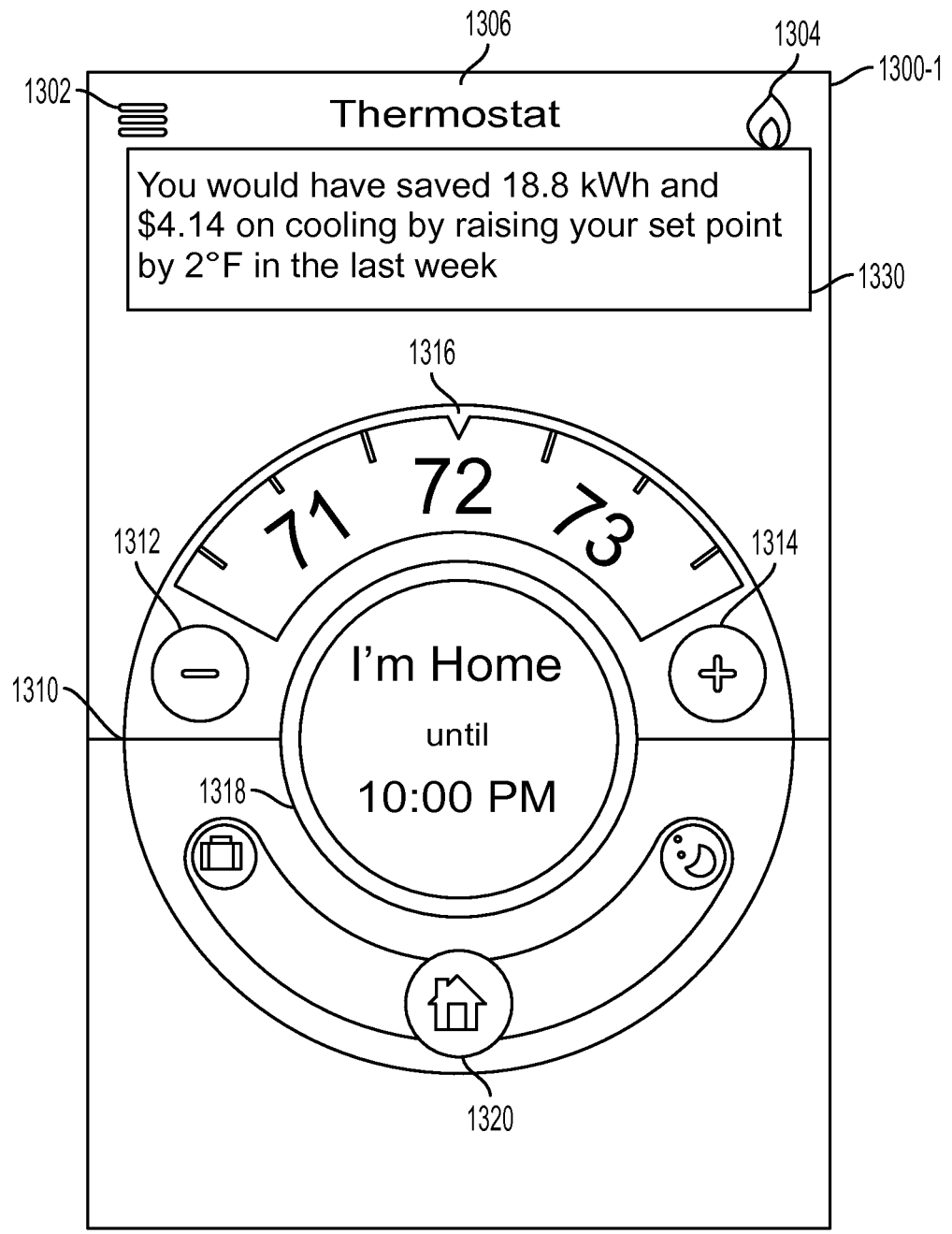
FIGS. 13A, 13B, and 13C illustrate a user interface (UI) of a client device, according to an embodiment.
Figure 13B:
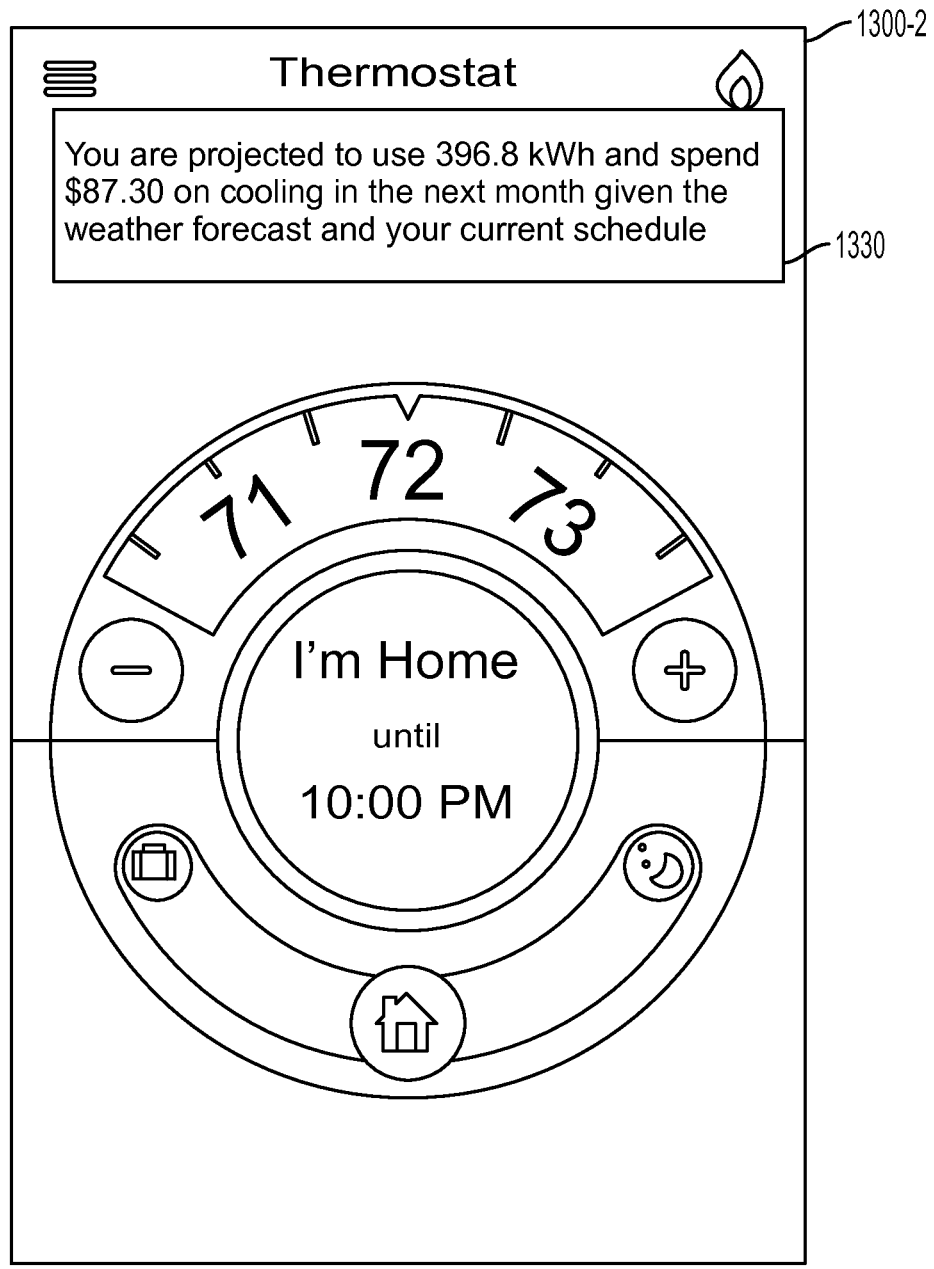
Figure 13C:
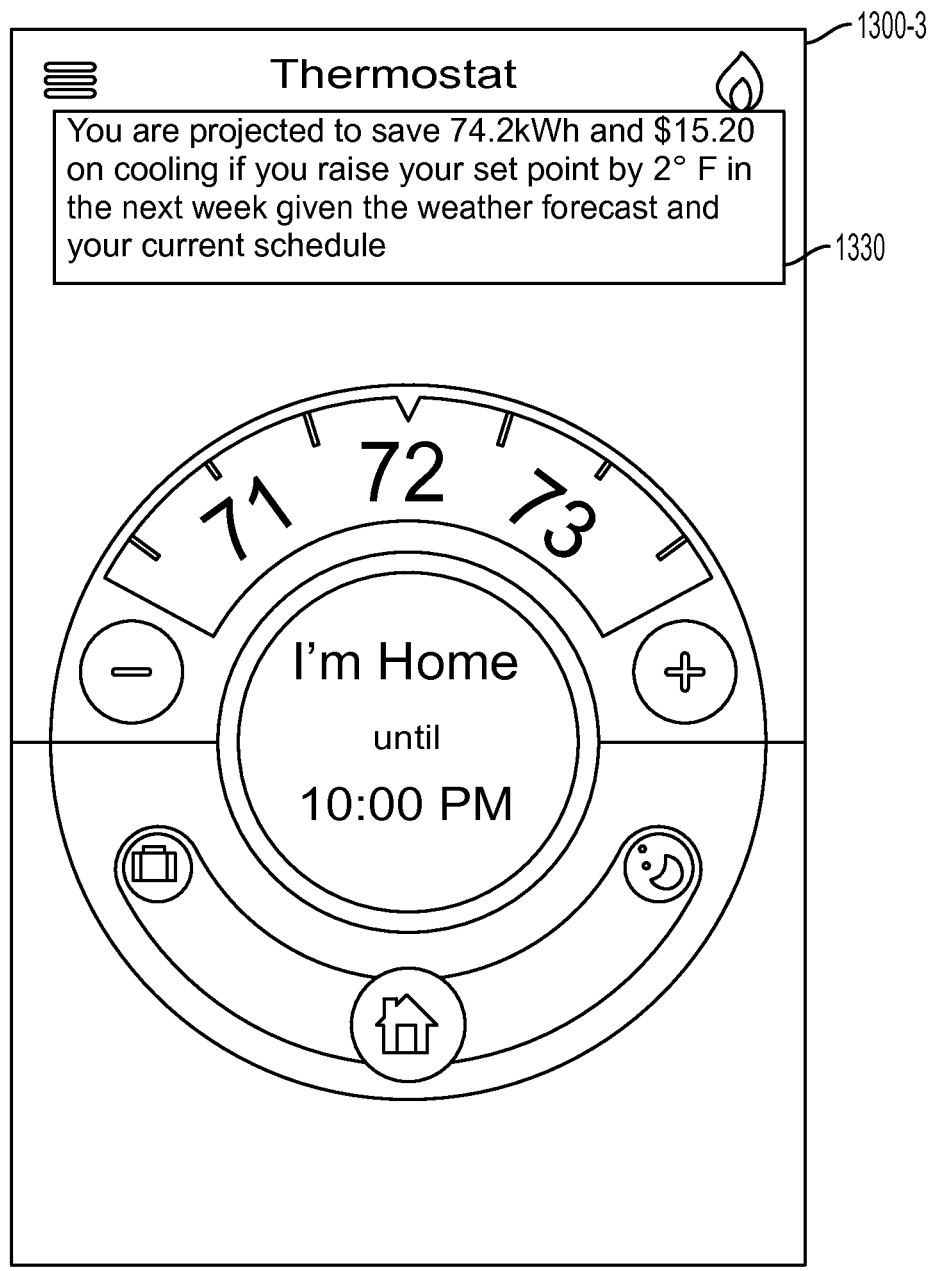

FIGS. 13A, 13B, and 13C illustrate a UI of a client device, according to an embodiment. For convenience, an embodiment illustrating a UI of a network thermostat on which an application implementing some embodiments is installed, is illustrated. However, the embodiment is not limited thereto, and any device having a display, e.g., a computer (not illustrated), a smartphone (not illustrated), etc., may constitute the client device 1000. In the descriptions of FIGS. 13A, 13B, and 13C, redundant explanation of the same elements as those of previous figures is omitted.

Referring to FIG. 13A, a screen 1300-1 illustrating a GUI in which a thermostat set point can be selected is displayed. Screen 1300-1 may be a default screen that is shown when the client device is active. As shown in screen 1300-1, a set point control UI 1310 may be displayed. A current temperature set point (i.e., "72° F.") 1316 of a building or portion of a building corresponding to the client device 1000, e.g., a user's home, may be displayed. The user can adjust the current temperature set point using buttons 1312, 1314 to control the HVAC system of the home. A current schedule 1318 of the user may be displayed. For example, the thermostat may be programmed to keep the home at an optimal temperature only when the user is schedule to be home (e.g., before 10:00 p.m.). One or more icons 1320 may also be displayed to indicate the current schedule period and other schedule periods (e.g., "home," "away," "sleep," etc.).

Because there are a number of different screens that may be displayed on the thermostat, a page identifier (i.e., "Thermostat") 1306 may be displayed to indicate to the user that the currently displayed page corresponds to the user's thermostat. Menu button 1302 may be displayed to allow the user to navigate to a menu screen (not illustrated). Icon 1304 may be displayed to identify a current program or mode. For example, a flame icon may be displayed to indicate a heating program, and a snowflake icon (not illustrated) may be displayed to indicate a cooling program. Finally, a thermostat message 1330 which may provide relevant information about set point schedules may be displayed.

As shown in FIG. 13A, the thermostat message 1330 may display a result of retrospective analysis. In particular, the system may calculate that the user could have saved 18.8 kWh and/or $4.14 on cooling by raising their set point by 2° F. in the last week. Accordingly, the system may enable the thermostat message 1330 to display "You would have saved 18.8 kWh and $4.14 on cooling by raising your set point by 2° F. in the last week."

Referring to FIG. 13B, the system may calculate a projected energy usage. Accordingly, the system may enable screen 1300-2 to be displayed. In screen 1300-2, the thermostat message 1330 may display a result of a projected energy usage calculation. In particular, if a user is projected to use 396.8 kWh and spend $87.30 on cooling in the next month given the weather forecast and the current set point schedule, the thermostat message 1330 may display "You are projected to use 396.6 kWh and spend $87.30 on cooling in the next month given the weather forecast and your current schedule."

Referring to FIG. 13C, the system may calculate a projected savings. Accordingly, the system may enable screen 1300-3 to be displayed. In screen 1300-3, the thermostat message 1330 may display a result of the projected energy savings. In particular, if a user is projected to save 74.2 kWh and $15.20 on cooling if they raise their set point by 2° F. in the next week give the weather forecast and the current set point schedule, the thermostat message 1330 may display "You are projected to save 74.2 kWh and $15.20 on cooling if you raise your set point by 2° F. in the next week given the weather forecast and current schedule."

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A method for calculating an estimated future indoor air temperature for a building, the method comprising:

receiving, by a network connection, information about a physical property of the building, information about environmental conditions, and thermostat set point information;

determining, using a processor, thermodynamic properties of the building based on the received information about the physical property of the building, wherein the thermodynamic properties of the building define a rate at which an indoor temperature within the building changes as a function of: (i) the received information about the physical property of the building, and (ii) the received information about environmental conditions;

wherein determining the thermodynamic properties of the building comprises:

setting a plurality of thermodynamic variables $\alpha$, $\beta$, and $\gamma$ to initial values; and optimizing the plurality of thermodynamic variables $\alpha$, $\beta$, and $\gamma$ by utilizing an optimization method to minimize error between a calculated indoor air temperature at a time i+1 and a measured indoor air temperature at the time i+1;

where $indoor\_temp_{i+1} = \alpha * indoor\_temp_i + (1-\alpha)*(outdoor\_temp_i - HVAC\_state_i * \beta + solar\_radiation_i * \gamma)$ where the $indoor\_temp_{i+1}$ is the calculated indoor air temperature for the building at the time i+1, the $indoor\_temp_i$ is an indoor air temperature for the building at a time i, the $outdoor\_temp_i$ is an outdoor air temperature for the building at the time i, the $HVAC\_state_i$ is an operating state of an HVAC system of the building at the time i, the $solar\_radiation_i$ corresponds to solar radiation on the building at the time i, and the time i and the time i+1 are times previous to a current time, wherein the optimized thermodynamic variables $\alpha$, $\beta$, and $\gamma$ correspond to insulation properties of the building, HVAC system properties of the building, and an effect of solar radiation on the building, respectively;

calculating the estimated future indoor air temperature at a plurality of time intervals using the determined thermodynamic properties of the building, the received information about environmental conditions, and the received thermostat set point information;

generating, by at least the processor, an optimized thermostat set point schedule for at least one thermostat in the building using the estimated future indoor air temperature at the plurality of time intervals; and based on the estimated future indoor air temperature at the plurality of time intervals, the processor causing load shifting of energy usage by reducing the energy usage of an HVAC system of the building during a peak use event while maintaining a desired indoor air temperature inside of the building by adjusting the thermostat set point schedule to cause the HVAC system to pre-cool the building before the peak use event based on the estimated future indoor air temperature at time intervals prior to a time of the peak use event, and maintaining the desired indoor air temperature inside of the building during the time of the peak use event.

2. The method of claim 1, wherein the received information about environmental conditions comprises:

an indoor air temperature for the building;

an outdoor air temperature for the building; and information about solar radiation on the building.

3. The method of claim 1, wherein the optimization method is at least one of a Gradient Descent Method or Newton's Method.

4. The method of claim 1, wherein the $indoor\_temp_i$, the $outdoor\_temp_i$ and the solar radiations are either measured at the time i, or estimated based on at least one of interpolations of surrounding data or historical data.

5. The method of claim 1, wherein the setting plurality of thermodynamic variables $\alpha$, $\beta$, and $\gamma$ to initial values comprises estimating the initial values using previously determined thermodynamic properties of buildings similar to the building.

6. The method of claim 1, wherein the calculating the estimated future indoor air temperature comprises:

calculating the estimated future indoor air temperature at a time j=1, where $$indoor\_temp_{j+1} = \alpha * indoor\_temp_j + (1-\alpha)*(outdoor\_temp_j - HVAC\_state_j * \beta + solar\_radiation_j * \gamma)$$

where the $indoor\_temp_{j+1}$ is the estimated future indoor air temperature inside of the building at the time j+1, the $indoor\_temp_j$ is an indoor air temperature for the building at a time j, the $outdoor\_temp_j$ is an outdoor air temperature for the building at the time j, the $HVAC\_state_j$ is an operating state of an HVAC system of the building at the time j, the $solar\_radiation_j$ corresponds to solar radiation on the building at the time j, $\alpha$ corresponds to determined insulation properties of the building, $\beta$ corresponds to determined HVAC system properties of the building, $\gamma$ corresponds to determined effect of solar radiation on the building, and the time j+1 is a time subsequent to the current time.

7. The method of claim 6, wherein the $indoor\_temp_j$, the $outdoor\_temp_j$, and the $solar\_radiation_j$ are either measured at the time j or estimated based on at least one of a weather forecast or historical data, and wherein the $HVAC\_state_j$ is determined using a $set\_point_j$, the $indoor\_temp_j$, and an $HVAC\_state_{j-1}$, where the $set\_point_j$ is a set point at the time j of a thermostat controlling the HVAC system of the building, which is determined based on the received thermostat set point information which includes a thermostat set point schedule, and the $HVAC\_state_{j-1}$ is an operating state of the HVAC system at a time j−1.

8. The method of claim 1, further comprising:

determining an efficiency of the building based on the determined thermodynamic properties;

comparing the determined efficiency of the building to efficiencies of buildings similar to the building to determine a relative efficiency of the building; and displaying the determined relative efficiency.

9. A non-transitory computer readable medium storing a program of instructions that when executed by at least one processor of a computer, cause the computer to:
- receive, over a network communication, information about a physical property of the building, information about environmental conditions, and thermostat set point information;
- determine thermodynamic properties of the building using the received information about the physical property of the building, wherein the thermodynamic properties of the building define a rate at which an indoor temperature within the building changes as a function of: (i) the received information about the physical property of the building, and (ii) the received information about environmental conditions;
- wherein determining the thermodynamic properties of the building comprises:
  - setting a plurality of thermodynamic variables $\alpha$, $\beta$, and $\gamma$ to initial values; and
  - optimizing the plurality of thermodynamic variables $\alpha$, $\beta$, and $\gamma$ by utilizing an optimization method to minimize error between a calculated indoor air temperature at a time i+1 and a measured indoor air temperature at the time i+1;
  - where indoor_temp$_{i+1}$=$\alpha$*indoor_temp$_i$+(1−$\alpha$)*(outdoor_temp$_i$−HVAC_state$_i$*$\beta$+solar radiation$_i$*$\gamma$)
  - where the indoor_temp$_{i+1}$ is the calculated indoor air temperature for the building at the time i+1,
  - the indoor_temp$_i$ is an indoor air temperature for the building at a time i,
  - the outdoor_temp$_i$ is an outdoor air temperature for the building at the time i,
  - the HVAC_state$_i$ is an operating state of an HVAC system of the building at the time i,
  - the solar radiation$_i$ corresponds to solar radiation on the building at the time i, and
  - the time i and the time i+1 are times previous to a current time,
  - wherein the optimized thermodynamic variables $\alpha$, $\beta$, and $\gamma$ correspond to insulation properties of the building, HVAC system properties of the building, and an effect of solar radiation on the building, respectively;
- determine an efficiency of the building based on the determined thermodynamic properties;
- compare the determined efficiency of the building to efficiencies of buildings similar to the building to determine a relative efficiency of the building;
- display the determined relative efficiency on a device;
- calculate the future indoor air temperature at a plurality of time intervals using the determined thermodynamic properties of the building, the received information about environmental conditions, and the received thermostat set point information;
- generate, by at least the processor, an optimized thermostat set point schedule for at least one thermostat in the building using the estimated future indoor air temperature at the plurality of time intervals; and
- based on the estimated future indoor air temperature at the plurality of time intervals, cause load shifting of energy usage by reducing the energy usage of an HVAC system of the building during a peak use event while maintaining a desired indoor air temperature inside of the building by adjusting the thermostat set point schedule to cause the HVAC system to pre-cool the building before the peak use event based on the future indoor air temperature at time intervals prior to a time of the peak use event, and maintaining the desired indoor air temperature inside of the building during the time of the peak use event.

10. The non-transitory computer readable medium of claim 9, further comprising instructions that, when executed by the at least one processor, cause the computer to estimate the future indoor air temperature using the determined thermodynamic properties of the building, the received information about environmental conditions, and the received thermostat set point information,
- wherein the determined thermodynamic properties of the building comprise:
- the insulation properties of the building;
- properties of a heating, ventilation, and air conditioning (HVAC) system of the building; or
- the effect of solar radiation on the building.

11. The non-transitory computer readable medium of claim 9, wherein the received information about environmental conditions comprises:
- an indoor air temperature for the building;
- an outdoor air temperature for the building; and
- information about solar radiation on the building.

12. The non-transitory computer readable medium of claim 9, further comprising instructions that, when executed by the at least one processor, cause the computer to:
- estimate a future operating state of the HVAC system of the building; and
- display at least one of the estimated future operating state of the HVAC system and the estimated future indoor air temperature.

13. The non-transitory computer readable medium of claim 9, further comprising instructions that, when executed by the at least one processor, cause the computer to:
- estimate an energy usage of the HVAC system of the building based on the future indoor air temperature at the plurality of time intervals, the determined thermodynamic properties of the building, the received information about environmental conditions, and the received thermostat set point information;
- estimate an optimized energy usage of the HVAC system of the building based on the future indoor air temperature at the plurality of time intervals, the determined thermodynamic properties of the building, the received information about environmental conditions, and optimized thermostat set point information; and
- display at least one of the estimated energy usage and the estimated optimized energy usage.

14. A system for determining thermodynamic properties of a building and estimating a future indoor air temperature for the building, the system comprising:
- a receiver configured to receive, by network communications, information about a physical property of the building, information about environmental conditions, and thermostat set point information;
- at least one processor connected to at least the receiver and to at least one memory, wherein the at least one memory including instructions that are executable by the at least one processor;
- the instructions, when executed by the at least one processor, cause the processor to implement:
  - a thermodynamic property determiner configured to determine thermodynamic properties of the building using the processor and the received information about the physical property of the building, wherein the thermodynamic properties of the building define a rate at which an indoor temperature within the building changes as a function of: (i) the received information about the physical property of building, and (ii) the received information about environmental conditions; wherein the thermodynamic properties of the building are determined by at least:

setting a plurality of thermodynamic variables $\alpha$, $\beta$, and $\gamma$ to initial values; and optimizing the plurality of thermodynamic variables $\alpha$, $\beta$, and $\gamma$ by utilizing an optimization method to minimize error between a calculated indoor air temperature at a time i+1 and a measured indoor air temperature at the time i+1;

where $indoor\_temp_{i+1} = \alpha * indoor\_temp_i + (1-\alpha)*(outdoor\_temp_i - HVAC\_state_i * \beta + solar\ radiation_i * \gamma)$ where the $indoor\_temp_{i+1}$ is the calculated indoor air temperature for the building at the time i+1, the $indoor\_temp_i$ is an indoor air temperature for the building at a time i, the $outdoor\_temp_i$ is an outdoor air temperature for the building at the time i, the $HVAC\_state_i$ is an operating state of an HVAC system of the building at the time i, the solar radiation$_i$ corresponds to solar radiation on the building at the time i, and the time i and the time i+1 are times previous to a current time, wherein the optimized thermodynamic variables $\alpha$, $\beta$, and $\gamma$ correspond to insulation properties of the building, HVAC system properties of the building, and an effect of solar radiation on the building, respectively;

an air temperature predictor configured to estimate the future indoor air temperature at a plurality of time intervals using the determined thermodynamic properties of the building, the received information about environmental conditions, and the received thermostat set point information;

wherein the instructions further cause the processor to:

generate an optimized thermostat set point schedule for at least one thermostat in the building using the future indoor air temperature at the plurality of time intervals; and based on the future indoor air temperature at the plurality of time intervals, cause load shifting of energy usage by reducing the energy usage of an HVAC system of the building during a peak use event while maintaining a desired indoor air temperature inside of the building by adjusting the thermostat set point schedule to cause the HVAC system to pre-cool the building before the peak use event based on the future indoor air temperature at time intervals prior to a time of the peak use event, and maintaining the desired indoor air temperature inside of the building during the time of the peak use event.

15. The system of claim 14, wherein the determined thermodynamic properties of the building comprise:

the insulation properties of the building;

heating, ventilation, and air conditioning (HVAC) system properties of the building; and the effect of solar radiation on the building, and wherein the received information about environmental conditions comprises:

an indoor air temperature for the building;

an outdoor air temperature for the building; and information about solar radiation on the building.

* * * * *